US008579624B2

(12) United States Patent
Sutton et al.

(10) Patent No.: US 8,579,624 B2
(45) Date of Patent: Nov. 12, 2013

(54) SYSTEMS AND METHODS FOR MAKING MULTI-WALL CORRUGATED PIPE

(75) Inventors: Gerald S. Sutton, Hamilton, OH (US); David J. Kelley, Hamilton, OH (US); Randall A. Kolbet, Liberty Township, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 546 days.

(21) Appl. No.: 12/721,253

(22) Filed: Mar. 10, 2010

(65) Prior Publication Data

US 2010/0224306 A1    Sep. 9, 2010

Related U.S. Application Data

(63) Continuation-in-part of application No. 12/028,990, filed on Feb. 11, 2008, now Pat. No. 7,988,438, and a continuation-in-part of application No. 12/251,034, filed on Oct. 14, 2008, now Pat. No. 8,114,324, and a continuation-in-part of application No. 12/250,960, filed on Oct. 14, 2008, now abandoned.

(51) Int. Cl.
*B29C 47/06* (2006.01)
*B29C 47/90* (2006.01)

(52) U.S. Cl.
USPC .... 425/296; 425/72.1; 425/133.1; 425/326.1; 425/336; 425/369; 425/377; 425/388; 425/392; 425/396

(58) Field of Classification Search
USPC .......... 425/72.1, 133.1, 140, 233, 296, 326.1, 425/336, 363, 369, 377, 380, 388, 392, 396
See application file for complete search history.

(56) References Cited

U.S. PATENT DOCUMENTS 3,869,235 A * 3/1975 Moore .......................... 425/113
3,990,827 A * 11/1976 Maroschak ................... 425/150

(Continued)

FOREIGN PATENT DOCUMENTS

| JP | 51-034268 | 3/1976 |
| WO | WO 2004/030894 | 4/2004 |
| WO | WO 2009/064396 | 5/2009 |

OTHER PUBLICATIONS

International Search Report mailed on Dec. 1, 2011, for PCT Application No. PCT/US2011/027210 (8 pages).

(Continued)

*Primary Examiner* — Yogendra Gupta
*Assistant Examiner* — Joseph Leyson
(74) *Attorney, Agent, or Firm* — Finnegan, Henderson, Farabow, Garrett & Dunner LLP

(57) ABSTRACT

A system is disclosed for manufacturing multi-wall corrugated polymer pipe. The system includes an extruder configured to co-extrude concentric annular tubes; a corrugator configured to form the concentric annular tubes into a dual-wall pipe having a smooth wall and a corrugated wall; a cross-head die configured to extrude an outer wall of pipe onto the corrugated wall of the dual-wall pipe; a vacuum punch configured to penetrate the outer wall of pipe and draw a vacuum between the corrugated wall and the outer wall, such that the outer wall of pipe deforms inward toward the corrugated wall of pipe between bell and spigot portions of the corrugated wall; and a cutter configured to cut the pipe into sections where the vacuum punch deformed the outer wall between the bell and spigot portions of the corrugated wall. A method of manufacturing multi-wall corrugated polymer pipe is also disclosed.

13 Claims, 23 Drawing Sheets

(56) References Cited

U.S. PATENT DOCUMENTS

| | | | |
|---|---|---|---|
| 4,158,534 A * | 6/1979 | Hegler et al. | 425/142 |
| 4,473,527 A * | 9/1984 | Fujisaki et al. | 264/566 |
| 4,942,070 A | 7/1990 | Labaig et al. | |
| 5,976,298 A * | 11/1999 | Hegler et al. | 156/244.14 |
| 2009/0127852 A1* | 5/2009 | Sutton et al. | 285/374 |
| 2009/0127853 A1 | 5/2009 | Sutton et al. | |
| 2009/0200694 A1 | 8/2009 | Sutton et al. | |

OTHER PUBLICATIONS

Written Opinion of the International Searching Authority mailed on Dec. 1, 2011, for PCT Application No. PCT/US2011/027210 (11 pages).

* cited by examiner

SYSTEMS AND METHODS FOR MAKING MULTI-WALL CORRUGATED PIPE

RELATED APPLICATIONS

This application is a continuation-in-part based on U.S. application Ser. No. 12/028,990 for EXTRUSION DIE VACUUM SEALS AND METHODS, filed on Feb. 11, 2008 by Gerald S. Sutton et al. (now U.S. Pat. No. 7,988,438); U.S. application Ser. No. 12/251,034 for APPARATUS AND METHOD FOR PRESSING AN OUTER WALL OF PIPE, filed on Oct. 14, 2008 by Gerald S. Sutton et al. (now U.S. Pat. No. 8,114,324); and U.S. application Ser. No. 12/250,960 for APPARATUS AND METHOD FOR COOLING AN OUTER WALL OF PIPE, filed on Oct. 14, 2008 by Gerald S. Sutton et al. (now abandoned), all of which are incorporated herein by reference in their entirety.

TECHNICAL FIELD

The present invention relates to manufacturing multi-wall corrugated polymer pipe, and more particularly, to systems and methods for manufacturing three walls of a multi-wall corrugated polymer pipe.

BACKGROUND

Corrugated pipe sections are used in the drainage of water-saturated soil in various agricultural, residential, recreational, or civil engineering and construction applications, such as for storm sewers. Corrugated pipe sections are also used for sanitary sewer pipe. Traditionally, drainage and sewer pipe was made from clay, concrete, or steel, which caused the pipe to be heavy, expensive, and brittle. In order to improve the cost-effectiveness, durability, and ease-of-installation of pipes, it is now common in the art to manufacture such pipes from alternative materials including various polymers and polymer blends.

Polymer pipe can be made by extruding raw polymer pellets into an annular tube of molten polymer, and then shaping it into a desired profile. The polymer pipe may also be made by co-extruding two annular tubes of molten polymer, and then shaping them together to form dual-wall pipe. One example of dual-wall polymer pipe is disclosed in U.S. patent application Ser. No. 11/078,323, filed on Mar. 15, 2005 by Goddard et al. In some cases, it may be desirable to improve the strength and resistance to deformation of such pipe in order to further improve its competitive advantage over traditional concrete drainage pipe.

Some attempts have been made at creating stronger pipe sections having three-walls, with a corrugated wall between two smooth walls. Such three-wall pipe has never before been successfully created in diameters larger than 14 inches, making it unsuitable for large diameter applications. Moreover, the attempts at making three-wall pipe have always involved the use of a sizing mandrel to create a smooth outer wall, which is insufficient in strength for large diameter applications.

After extrusion and molding, plastic pipe is often cut to form relatively light, manageable, and transportable sizes of pipe sections, ranging from a few feet to many yards in length. Once these plastic pipe sections are transported to their desired installation location, they are assembled lengthwise by the installation of joints, adhesives, or other coupling means. This coupling process has generally been complex, requiring the transportation of many tools and supplies to the job site, and has required many man-hours for completion.

For example, one method of assembly involves the formation of a wide-diameter bell at one end of each plastic pipe section. During the pipe manufacturing process, an apparatus known as a "beller" is sometimes used to radially expand the end of the pipe, forming an expanded bell-shaped structure, such that the opposite end of an adjacent pipe section may be inserted into the expanded bell-shaped end. Alternatively, bell and spigot portions are affixed to pipe sections, e.g., using a hot plate welder, or the like. These processes have several disadvantages, including weaknesses that require additional means of reinforcement, such as external straps, hinged brackets, overlapping wraps, shrink-wrap layers, or a combination of such reinforcement means. Finally, these bells and other known coupling means require precise and careful excavation, installation, and backfill, to avoid misalignment between pipe sections and expanded coupling sections during assembly and placement. The improper installation of these coupling means often results in joint failure, buckling, and an inability to form a water-tight seal between adjacent pipe sections.

One example of an improved water-tight, in-line, bell and spigot, which can be used for coupling sections of three-wall, corrugated pipe, was disclosed in U.S. patent application Ser. No. 11/941,605, filed by Gerald S. Sutton et al. on Nov. 16, 2007. In order to create pipe sections having such a water-tight, in-line bell and spigot at either end, there is a need to extrude an outer wall of plastic onto a dual-wall corrugated pipe having in-line bell and spigot preforms. The three-wall pipe can then be cut between adjacent in-line bells and spigots. However, the creation of three-wall corrugated pipe involves many challenges, especially in large diameter applications.

Accordingly, there is a need for improved systems and methods for making multi-wall corrugated polymer pipe.

SUMMARY

It is an object of the present invention to provide such systems and methods for making multi-wall corrugated polymer pipe.

One exemplary embodiment of the present disclosure provides a system for manufacturing multi-wall corrugated polymer pipe. The system includes an extruder configured to co-extrude concentric annular tubes; a corrugator configured to form the concentric annular tubes into a dual-wall pipe having a smooth wall and a corrugated wall; a cross-head die configured to extrude an outer wall of pipe onto the corrugated wall of the dual-wall pipe; a vacuum punch configured to penetrate the outer wall of pipe and draw a vacuum between the corrugated wall and the outer wall, such that the outer wall of pipe deforms inward toward the corrugated wall of pipe between bell and spigot portions of the corrugated wall; and a cutter configured to cut the pipe into sections where the vacuum punch deformed the outer wall between the bell and spigot portions of the corrugated wall.

Another exemplary embodiment of the present disclosure provides a method of manufacturing multi-wall corrugated polymer pipe. The method includes co-extruding dual-wall pipe having a smooth wall and a corrugated wall; extruding an outer wall of pipe onto the corrugated wall of the dual-wall pipe; penetrating the outer wall of pipe with a vacuum punch; and drawing a vacuum between the corrugated wall and the outer wall via the vacuum punch, between bell and spigot portions of the corrugated wall.

Another exemplary embodiment of the present disclosure provides a system for manufacturing multi-wall corrugated polymer pipe. The system includes an extruder configured to co-extrude concentric annular tubes; a corrugator configured to form the concentric annular tubes into a dual-wall pipe having a smooth wall and a corrugated wall; a cross-head die configured to extrude an outer wall of pipe onto the corrugated wall of the dual-wall pipe; a vacuum punch configured to penetrate the outer wall of pipe and draw a vacuum between the corrugated wall and the outer wall, such that the outer wall of pipe deforms inward toward the corrugated wall of pipe; and an outer wall punch configured to punch the outer wall between adjacent corrugations of the corrugated wall.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the disclosure, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

DESCRIPTION OF THE EXEMPLARY EMBODIMENTS

Reference will now be made in detail to the exemplary embodiments described above and illustrated in the accompanying drawings.

Figure 1:
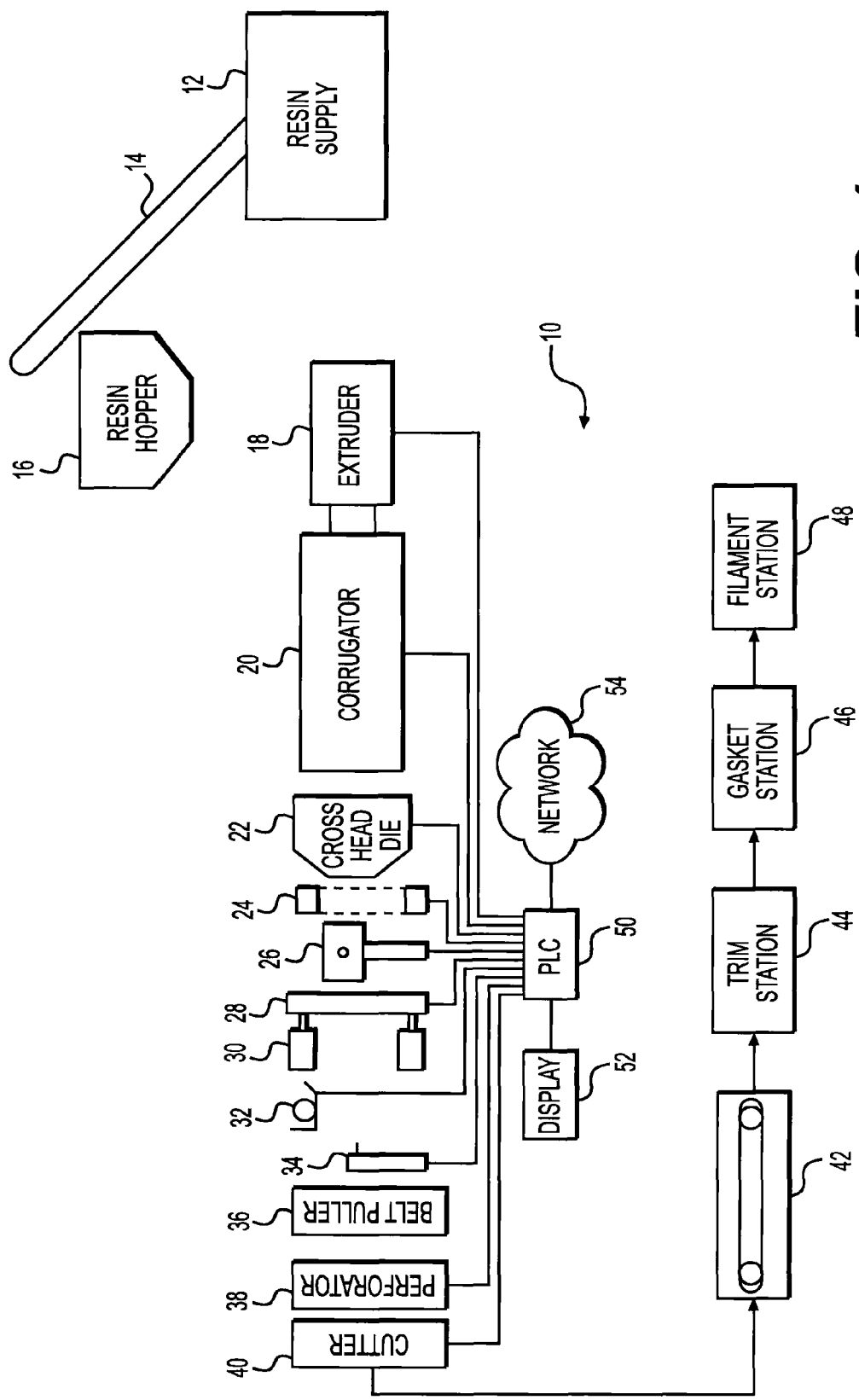
FIG. 1 is a graphical representation of an exemplary system for manufacturing multi-wall corrugated polymer pipe.

FIG. 1 depicts an exemplary embodiment of a system 10 for making multi-wall corrugated polymer pipe. System 10 may include a series of machines configured to form various components of a multi-wall corrugated polymer pipe, as well as perform post-processing steps on the formed pipe. In one embodiment, system 10 may include a resin supply 12, which stores the raw material that will be used to form the layers of polymer pipe. Resin supply 12 may store various types of polyethylene (PE) and polypropylene (PP) pellets. The pellets may be 100% PE, 100% PP, or blends of recycled PE or PP. The pellets may also include various combinations of pure, virgin pellets, and recycled material pellets. Resin supply 12 may also include pigment pellets that are configured to colorize the polymer pellets to achieve a desired final pipe color. System 10 may also include a transporter 14, for transferring the resin and dye pellets from resin supply 12 to a resin hopper 16. Transporter 14 may include vacuum lines, a conveyor belt, or any other type of transport device configured to move resin and dye pellets from resin supply 12 to resin hopper 16. Thus, resin supply 12 may be positioned away from the manufacturing line, such as near a train or trucking depot where pellets are received from suppliers in large quantities. Resin hopper 16 may be positioned at the beginning of a manufacturing line for making the multi-wall corrugated polymer pipe. Resin hopper 16 may be configured to selectively meter the resin and/or dye pellets into an extruder 18. In one embodiment, resin hopper 16 may also be configured to pre-heat and/or pre-mix resin and dye pellets before metering them to extruder 18.

Plastic materials consistent with the present invention include most polymers, including but not limited to polymer blends, natural and synthetic resins, polyolefins, such as polyethylene and polypropylene, polyesters, polyamides, polyurethanes, polyvinyl chlorides, and thermoplastics elastomers. In one exemplary embodiment, the material may be an impact copolymer polypropylene, such as a homopolymer propylene having an uncured ethylene/propylene (EP) rubber dispersed therein during polymerization. In this embodiment, the EP rubber may act as an impact modifier, offering suitable low temperature performance, while the rubber may reduce the flexural modulus of the material, thereby adding toughness and impact resistance.

Extruder 18 may be configured to heat and mix the selectively metered resin and dye pellets into a homogenous fluid melt, called a parison. Specifically, extruder 18 may be configured to receive the stock material, including virgin plastic pellets, plant regrind, recycled flake, and/or powders, from resin hopper 16, and to heat and compress the stock material to form the parison. A screw or other conveying device in extruder 18 may advance the plastic fluid melt along an interior passageway of extruder 18. Extruder 18 also may be in fluid communication with one or more flowpaths at an end opposite from hopper 16. Extruder 18 may include a screen changer having one or more screens for filtering dirt and other contaminants from the fluid melt before the fluid melt enters one or more dies at the flowpath end of extruder 18. In one embodiment, extruder 18 includes two flowpaths and two concentric, annular die outlets, which result in concentric, annular tubes of molten plastic being extruded from extruder 18.

The two resulting concentric, annular tubes of molten plastic may be urged into a corrugator 20, where the outer tube is pulled into the inner cavities of mold halves that are continuously moving through the corrugator. The inner cavities may have corrugation shapes configured to form corrugations in the outer tube of molten plastic. As the annular tubes of polymer and corrugation molds move continuously through corrugator 20 away from the extruder 18, they result in the formation of a dual-wall pipe that has a smooth inner wall and a corrugated wall. The corrugated wall may have a plurality of alternating corrugation crests and corrugation valleys, with the corrugation valleys being fused to the smooth inner wall. In order to improve the performance of such a pipe, it may be desirable to extrude an additional layer of polymer onto the pipe. For example, a cross-head die may be used to extrude an outer layer of polymer onto the exterior surface of the corrugated wall, thereby forming three-wall, corrugated polymer pipe.

Thus, a cross-head die 22 may be positioned downstream from corrugator 20, for extruding a third, outer wall onto the dual-wall pipe. As the dual-wall pipe exits corrugator 20 and enters cross-head die 22, the dual-wall pipe may also enter a vacuum chamber through retractable seals that create a vacuum when they are extended to contact the dual-wall pipe, as will be described in relation to FIG. 3. The vacuum may be used to pull the newly-extruded outer wall into contact with the corrugated wall of the dual-wall pipe, and to keep the outer wall from drooping out of shape. Inside the vacuum chamber of cross-head die 22, the pipe may be heated with radiant heaters to make the corrugated wall of the dual-wall pipe warm enough to cohesively bond to the newly-extruded outer wall. The preheated dual-wall pipe may then pass under an outer wall melt outlet of cross-head die 22. Thus, the third, outer-wall is extruded by cross-head die 22 onto the dual-wall pipe, thereby forming three wall, corrugated polymer pipe. The outer wall may have been fed from a new extruder, through a screen changer, and through cross-head die 22 to produce an outer wall that is smooth. The smooth outer wall may be draped over the corrugated dual-wall pipe such that is has sufficient melt strength to span the distance between the tops of corrugations in the corrugated wall. The melt strength may be controlled by controlling the temperature at which polymer is extruded, and by selecting a polymer with a suitable inherent molecular weight. In one embodiment, an air ring 24 may be positioned immediately downstream from, or even mounted directly to, cross-head die 22 for controlling droop or sag of the outer wall between corrugations in the corrugated wall. For instance, air ring 24 may be configured to slightly cool just an outer surface of the outer wall.

In some embodiments, it may be desirable to deform the outer wall after it has been extruded from cross-head die 22, but before it completely cools and hardens. Thus, system 10 may also include a vacuum punch 26 positioned downstream from cross-head die 22. Vacuum punch 26 may be used to draw down the outer wall of pipe, by removing air from selected spaces between the outer wall and the corrugated wall. For example, in some embodiments it may be desirable to draw down the outer wall in the area between the bell and spigot sections formed into the corrugated wall. Vacuum punch 26 may be configured to puncture a hole in the outer wall, either by thinning a point of the outer wall until it ruptures, or by penetrating into the outer wall with a sharp point or needle. Vacuum punch 26 may then suck the air out from behind the outer wall, thereby creating a pressure differential that forces the outer wall inward towards the corrugated wall, as will be described in more detail with reference to FIGS. 4-13C.

Once the outer wall has been desirably deformed, the pipe may be cooled and pressed such that it hardens to form. Thus, system 10 may further include an air ring 28 and/or a press roller 30. Air ring 28 may be used to blow air around a circumference of the three-wall pipe, so as to cool and harden the outer wall, as will be described in more detail with reference to FIGS. 14 and 15. Air ring 28 may be oriented relative to cross-head die 22 such that an angled, annular passageway directs air axially-downstream and radially-inward towards a pipe translating through air ring 28. Press roller 30 may include one or more orbiting rollers for contacting the outer surface of the outer wall, and applying pressure such that the inner surface of the outer wall bonds sufficiently to the crowns of the corrugated wall, thereby strengthening the resulting three-wall pipe, as will be described in more detail with reference to FIGS. 16-19. Of course, the positions and orientations of air ring 28 and press roller 30 may be adjusted based on material properties of the polymer and/or pipe, extrusion/corrugator speeds, and/or the desired geometry of the outer wall.

System 10 may also include a sensor 32, which is configured to detect corrugations in the translating pipe. Sensor 32 may be any suitable type of sensor, such as an optical sensor, tactile sensor, or motion sensor, configured to detect corrugations. Sensor 32 may be positioned at almost any location along the length of system 10, even though it happens to be depicted downstream from press roller 30. However, it may be desirable to position sensor 32 at a location where the geometry of the pipe has become relatively hardened and static. An output from sensor 32 may be used to operate other mechanisms within system 10 that operate as a function of a location along the pipe. For example, system 10 may also include an outer wall punch 34, which is configured to punch holes in the outer wall between adjacent corrugations in the corrugated layer. The holes punched by outer wall punch 34 may allow air to vent from the annular spaces created between the corrugated wall and the outer wall, thereby relieving any pressure build-up or vacuum formed from cooling air. The output from sensor 32 may be used to inform outer wall punch 34 when to actuate, so as to vent locations between the corrugation crests. Thus, a signal sent to outer wall punch 34 may be a function of a sensor output, a location of sensor 32, and a location of outer wall punch 34.

System 10 may also optionally, but not necessarily, include a spray tank (not shown) positioned downstream from the press roller 30 for spraying water on the outside of the pipe to cool the pipe. System 10 may also include a belt puller 36, which includes a plurality of belts for pulling the pipe through a blow dryer. System 10 may further include a perforator 38 for slotting or drilling perforations into the pipe. For example, perforator 38 may be configured to form small slots in the outer wall between each corrugation, to allow air and/or water to pass through the outer wall, as desired.

System 10 may also include a cutter 40 positioned downstream from perforator 38 and belt puller 36. In one embodiment, cutter 40 may be a rotating knife cutter configured to cut the pipe between adjacent bell and spigot preform portions of adjacent pipe sections. Thus, cutter 40 may sever the continuously manufactured pipe into discrete pipe sections, each pipe section having a bell at one end and a spigot at an opposite end. The discrete pipe sections may then be transported by conveyor 42 to a trim station 44. Trim station 44 may be used to cut away any undesired sections or layers of pipe, as will be described in more detail below with reference to FIGS. 7-9B. In one embodiment, gasket grooves may also be cut into bell or spigot corrugations, as desired. The pipe sections may then be conveyed to gasket station 46, where one or more gaskets may be stretched to fit around a spigot portion of each section, and/or compressed to fit within a bell portion of each section, as desired. Finally, the pipe sections may be optionally conveyed to a filament station 48 where fiberglass prepreg may be welded, cohesively bonded, or wrapped around the bell portion of each pipe section to strengthen the bell. Of course, in some embodiments, it may not be desired to perform the fiberglass addition step at filament station 48, since the bell and spigot portions may both already be sufficiently strong by virtue of the third, outer wall disposed thereon.

In one embodiment, system 10 may further include a programmable logic controller (PLC) 50 and a display 52 disposed in communication with one or more other machines in system 10. PLC 50 may also be disposed in wired or wireless communication with a network 54, such as a local-area network (LAN), wide-area network (WAN), such as the Internet, by which system 10 may be controlled remotely and/or autonomously. For example, in one embodiment, PLC 50 may be connected to the sensor 32 and outer wall punch 34. In another embodiment, PLC 50 may be connected to the sensor 32, outer wall punch 34, press roller 30, and vacuum punch 26. In yet another embodiment, PLC 50 may be connected to any desired combination of any of the machines in system 10, including all of them.

Figure 2:
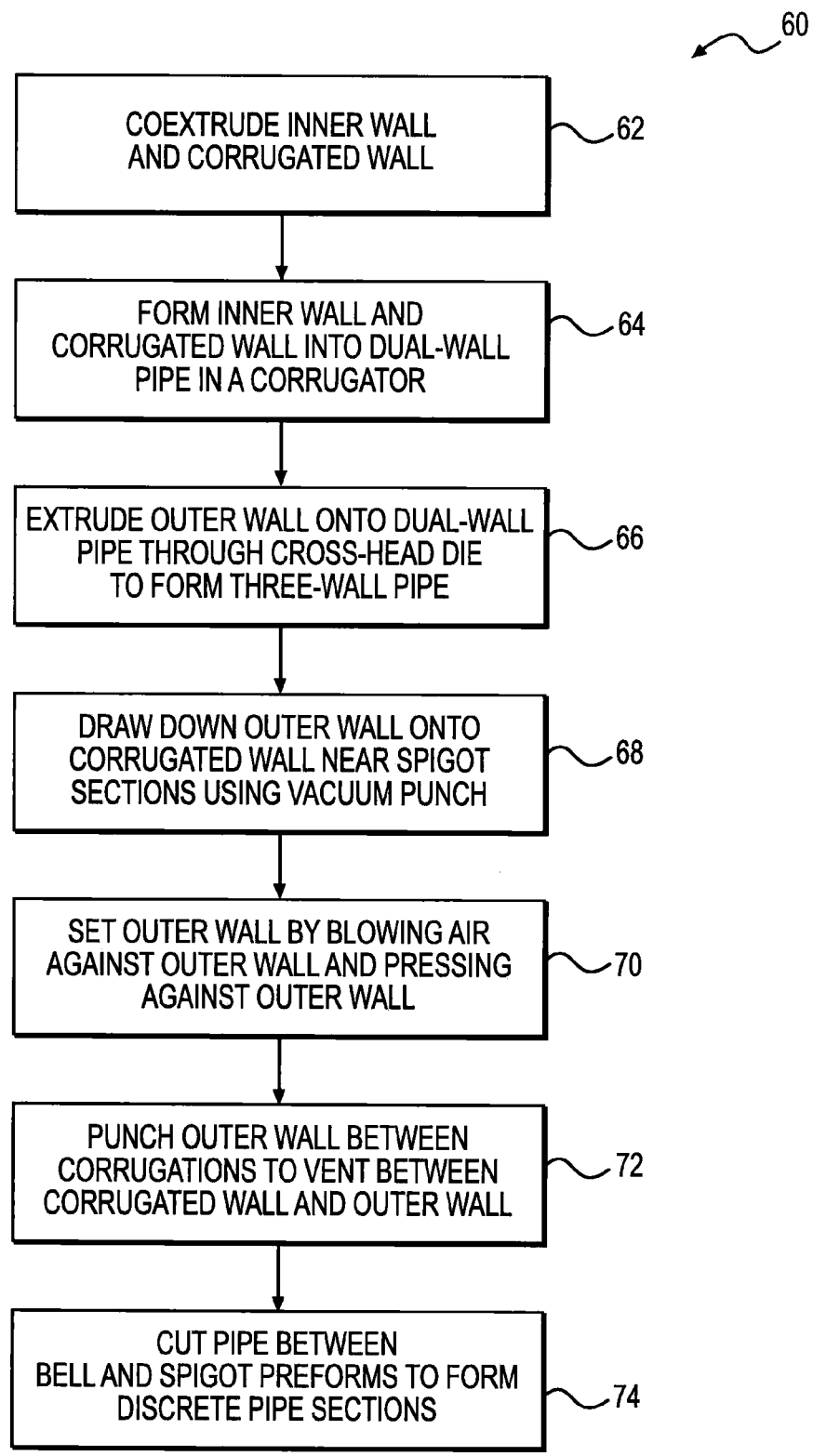
FIG. 2 is a flow chart depicting an exemplary method of manufacturing multi-wall corrugated polymer pipe.

FIG. 2 depicts a method 60 for making multi-wall corrugated polymer pipe, for example, using the exemplary system 10 of FIG. 1. Method 60 may include co-extruding an inner wall and corrugated wall using extruder 18 (step 62). Method 60 may then include forming the extruded inner wall and corrugated wall into dual-wall, corrugated pipe using corrugator 20 (step 64). Method 60 may then include extruding a third, outer wall onto the corrugated dual-wall pipe, using cross-head die 22, to form three-wall corrugated pipe (step 66). Method 60 may then include drawing down the outer wall onto the corrugated wall near spigot sections of the pipe, by using vacuum punch 26 (step 68). Method 60 may further include setting the outer wall by blowing air against the outer wall using air ring 28, and pressing against the outer wall using press roller 30 (step 70). Method 60 may further include punching perforations into the outer wall between corrugations in the corrugated wall, to vent the spaces between the corrugated wall and the outer wall (step 72). For example, outer wall punch 34 may be used to punch the perforations, based on feedback on the pipe location and translation generated by sensor 32. Method 60 may also include cutting the pipe between bell and spigot preforms to form discrete sections of pipe, by using cutter 40 (step 74). Method 60 may also optionally include the steps of spraying the pipe with water, blow drying the pipe, perforating the pipe, trimming the pipe sections, applying gaskets to bell and/or spigot portions of the pipe sections, and/or applying filament to the bell portions.

Exemplary machines and processes of system 10 and method 60 will now be described in more detail with reference to FIGS. 3-20.

Figure 3:
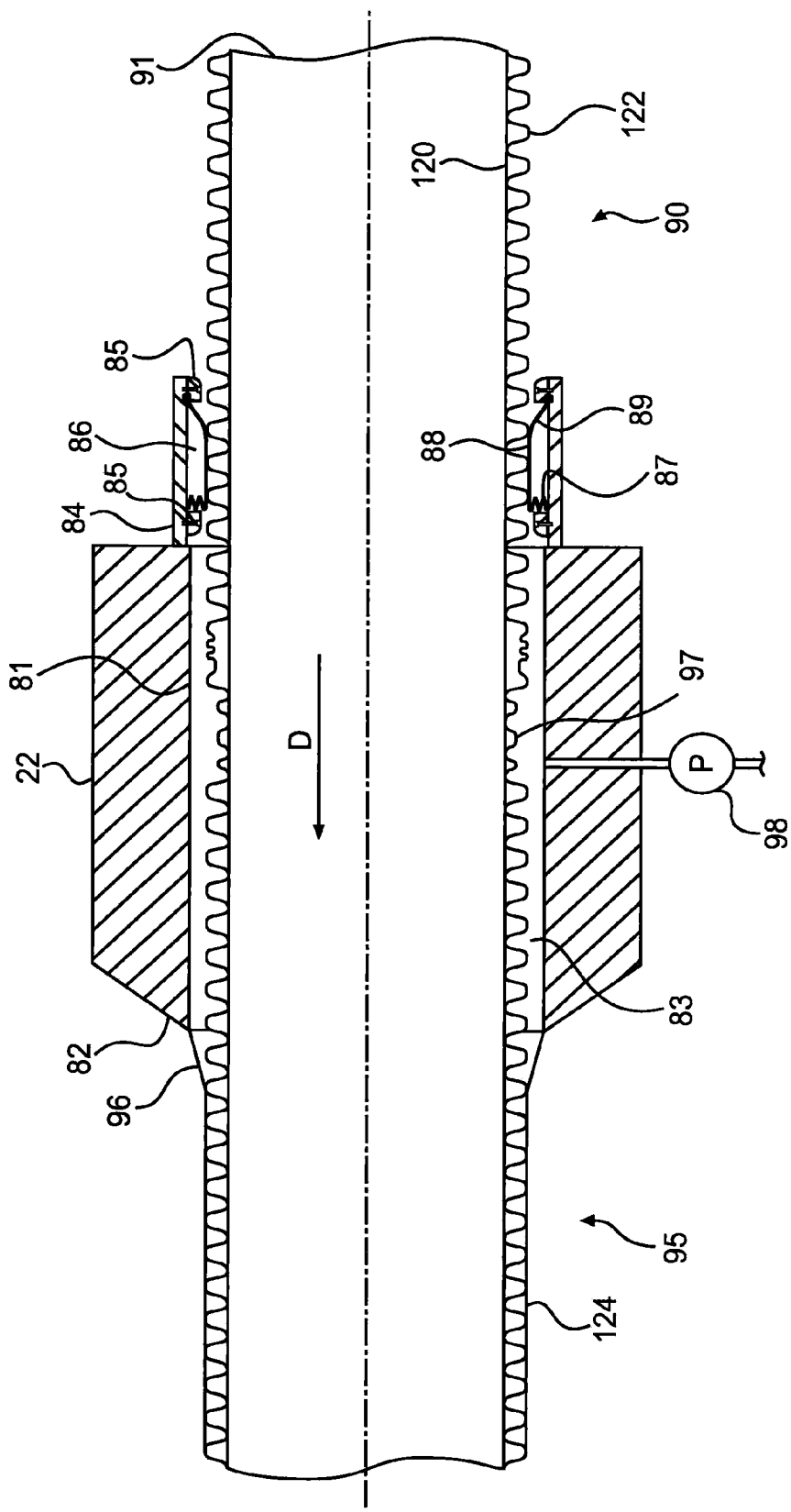
FIG. 3 depicts an exemplary system and process by which an outer layer of polymer may be extruded onto a corrugated pipe.

Generally, FIG. 3 illustrates an exemplary system and process by which an outer layer of polymer may be extruded onto a corrugated pipe, using cross-head die 22. In particular, FIG. 3 illustrates a double wall pipe 90 traveling in a direction D as it enters an cross-head die 22. For example, the double wall pipe 90 may be moving in the direction D at a speed of approximately 3 ft/min. The double wall pipe 90 may include a pipe bore 91, a smooth inner wall 120, and a corrugated wall 122. In one embodiment, the corrugated wall 122 may have an outer diameter of approximately 30-40 inches. In another embodiment, corrugated wall 122 may have an outer diameter as large as 60 inches.

The cross-head die 22 may be a component of any type of extrusion die system configured to continuously extrude an annular layer of polymer onto a product, such as the corrugated wall 122 of the double wall pipe 90. For example, in one embodiment, the cross-head die 22 may have a distributor for forming an annular layer of polymer. As depicted in FIG. 3, the cross-head die 22 may extrude a layer of molten polymer 96 out of a downstream die head 82. As the layer of molten polymer 96 exits the downstream die head 82, the layer of molten polymer 96 may contact the double wall pipe 90 and form a smooth but semi-corrugated outer wall 124 on the corrugated wall 122, thereby forming a triple wall pipe 95. In one embodiment, the outer wall 124 may have 0.25" corrugations (i.e., 0.25" height) between a valley and crest of the outer wall, where each valley extends between adjacent corrugations in the double wall pipe.

In one embodiment, in order to improve the level of bonding between the smooth outer wall 124 and the corrugated wall 122 during this process, a vacuum may be applied to the upstream side of the layer of molten polymer 96 as it exits the downstream die head 82. A pressure differential created by such a vacuum may be used to urge the layer of molten polymer 96 against the crowns of the corrugated wall 122, thereby more securely bonding the resulting smooth outer wall 124 to the double wall pipe 90. In one exemplary embodiment, a pressure differential may be applied to the upstream side of the layer of molten polymer 96 by sealing and creating a vacuum within an interior die chamber 83, which is defined by an inner bore 81 of the cross-head die 22.

As illustrated in the embodiment of FIG. 3, the interior die chamber 83 may be sealed by providing a vacuum seal 86 at an upstream end of the cross-head die 22. For example, the cross-head die 22 may include an annular housing 84, which extends upstream from the cross-head die 22. In one embodiment, vacuum seal 86 may be removably attached by its outer diameter to an inner diameter of the annular housing 84. The annular housing 84 may include a plurality of clamp rings 85, which removably attach the vacuum seal 86 to the annular housing 84. For example, as illustrated in FIG. 3, the vacuum seal 86 may be retained by a first clamp ring 85 at its upstream end and a second clamp ring 85 at its downstream end. As will be appreciated by one of skill in the art, vacuum seal 86 may be mounted to an upstream end of the cross-head die 22 by any other suitable means that allows the quick and efficient replacement or repair of the vacuum seal 86.

The vacuum seal 86 may be any type of hollow, annular seal suitable for selectively forming a seal between the double wall pipe 90 and an upstream end of the cross-head die 22. In one embodiment, the vacuum seal 86 may be a hollow, inflatable tube configured to sit securely in a groove of the annular housing 84. Such a configuration may eliminate the need for clamp rings 85 altogether. In an alternative embodiment, the vacuum seal 86 may be an annular sheet of polymer, which can be expanded and contracted into and out of contact with the double wall pipe 90, by the force of an air pump or vacuum. Moreover, the vacuum seal 86 may be made from any type of resilient material suitable for forming such a seal. In one embodiment, the vacuum seal 86 may be formed out of an elastomeric or thermosetting polymer, such as rubber. Alternatively, the vacuum seal 86 may be formed out of silicone.

As illustrated in the embodiment of FIG. 3, the vacuum seal 86 may include an annular sealing surface 88, which may contact the double wall pipe 90. In one embodiment, the annular sealing surface 88 may be long enough in the axial direction of the pipe to extend across at least two corrugations of the corrugated wall 122. In another embodiment, the annular sealing surface 88 may extend across at least three corrugations of the corrugated wall 122.

On one end, the vacuum seal 86 may also include a plurality of bellows 87, which may extend between the annular sealing surface 88 and a portion of the vacuum seal 86 abutting the annular housing 84. According to a preferred embodiment, the vacuum seal 86 may include an angled shoulder 89 at an upstream end and a plurality of bellows 87 at a downstream end. This embodiment may advantageously prevent the vacuum seal 86 from rotating, or otherwise undesirably deforming, upon contact with the double wall pipe 90. Of course, as will be appreciated by one of skill in the art, the vacuum seal 86 may have any suitable shape, as long as it is conducive to being collapsed as desired. For example, the vacuum seal 86 may alternatively include bellows at both upstream and downstream ends, or alternatively, no bellows at all.

FIG. 3 illustrates the vacuum seal 86 in its naturally-expanded, or inflated, condition. That is, in its normal, unbiased state, the vacuum seal 86 may have an inner diameter (defined by the annular sealing surface 88), which approximates the outer diameter of the double wall pipe 90. For example, this inner diameter may be slightly smaller than, equal to, or slightly larger than the outer diameter of the double wall pipe 90. In this condition, the vacuum seal 86 may advantageously seal the interior die chamber 83, from which a pump 98 or other suitable device may remove gas, thereby creating a vacuum, and forming a pressure differential across the layer of molten polymer 96.

Specifically, the vacuum seal 86 may selectively form a seal between the double wall pipe 90 and the annular housing 84 of the cross-head die 22. Accordingly, the annular, interior die chamber 83 may be sealed off between opposing surfaces of the double wall pipe 90, the inner bore 81, the layer of molten polymer 96, and the vacuum seal 86. Having sealed the interior die chamber 83, a pump 98 may be incorporated into the cross-head die 22 to apply a vacuum of approximately 2-10 inches of water column pressure to the interior die chamber 83. The pump 98 may be any type of pump suitable for drawing a vacuum on the interior die chamber 83.

In certain circumstances, it may be unnecessary and in fact disadvantageous to maintain a seal at an upstream end of the cross-head die 22. Accordingly, the vacuum seal 86 may be selectively manipulated to open the interior die chamber 83 to atmospheric pressure. Specifically, the inner diameter (defined by the annular sealing surface 88) may be expanded to a diameter substantially larger than the outer diameter of the double wall pipe 90. In one embodiment, this inner diameter may be expanded by drawing gas out of the hollow interior of vacuum seal 86, so as to collapse, or deflate the vacuum seal 86. For example, any type of pump or vacuum may be applied to a passageway extending into the hollow interior of the vacuum seal 86.

Vacuum seal 86 may alternatively be in a collapsed, or deflated, condition. In this manipulated state, the inner diameter of the vacuum seal 86 may advantageously provide approximately 1 inch of clearance between itself and the double wall pipe 90. Therefore, the vacuum seal 86 may avoid being impacted by irregularities in the geometry of the moving double wall pipe 90. Moreover, the vacuum seal 86 may avoid imposing a drag force against the pipe, during certain operations of the cross-head die 22.

Referring in particular to the operation of the cross-head die 22 and its vacuum seal 86, the vacuum seal 86 may be selectively manipulated to cooperate with the passage of a product through the cross-head die 22. In general, the vacuum seal 86 may be substantially unbiased during normal operation of the cross-head die 22. Specifically, the vacuum seal 86 may be either maintained in its natural condition or supplied with pressurized air or gas to urge the annular sealing surface 88 against a product moving through the extrusion die, such as the corrugated wall 122.

In one embodiment, the double wall pipe 90 may include portions of corrugated wall 122 that have a reduced outer diameter. For example, as illustrated in FIG. 3, the corrugated wall 122 may have a reduced-diameter portion 97, corresponding to an in-line pipe coupling structure, located approximately at 20 feet intervals along the length of pipe. In this case, the vacuum seal 86 may be supplied with sufficient additional amounts of pressurized air or gas for the annular sealing surface 88 to contact the reduced-diameter portion 97.

In some embodiments, certain reduced-diameter portions of the double wall pipe 90 may justify the use of more than one vacuum seal 86. For example, it may be desirable to include one or more additional vacuum seals disposed upstream from the vacuum seal 86 illustrated in FIG. 3. Such vacuum seals may include the same or varying geometries, as desired, to create a seal between the double wall pipe 90 and the cross-head die 22. In one embodiment, a plurality of vacuum seals may be spaced apart axially by a sufficient distance to ensure that at least one of the vacuum seals is contacting a standard diameter portion of the double wall pipe 90 while a reduced-diameter portion 97 is inside the interior die chamber 83.

Alternatively, there may be certain operations of the cross-head die 22 that would benefit from the vacuum seal 86 being collapsed, or deflated, as described above. For example, the vacuum seal 86 may be deflated when the cross-head die 22 is not operating normally. Moreover, the vacuum seal 86 may be automatically deflated just before the cross-head die 22 is shut-down; while the cross-head die 22 is fully shut-down; and/or when the cross-head die 22 is undergoing an emergency shut-down. During such an emergency, a battery-powered back-off system might be unable to efficiently overcome the drag induced by an unbiased or inflated vacuum seal 86.

It is contemplated that the vacuum seal 86 may also be automatically-programmed and/or manually-overridden to deflate in any other situation during which a vacuum is not required in the interior die chamber 83 or during which drag against the double wall pipe 90 is undesirable.

An embodiment of a method for selectively sealing an end of the cross-head die 22 may include: providing a vacuum seal 86 at an upstream end of the cross-head die 22, the vacuum seal 86 including an annular sealing surface 88 disposed at an inner diameter of the vacuum seal 86; maintaining the vacuum seal 86 in a sealing relationship between the cross-head die 22 and a product traveling through the cross-head die 22 when the cross-head die 22 is operating normally; and applying a vacuum to an interior of the vacuum seal 86 so as to collapse the vacuum seal 86 when the cross-head die 22 is not operating.

Of course, even though the cross-head die 22 and vacuum seal 86 have been described with respect to the manufacture of a triple wall pipe 95, the presently-disclosed devices and methods may be applicable to the manufacture of literally any product having a layer of polymer continuously-extruded onto its surface.

FIGS. 4-13C will depict the exemplary systems and methods relating to vacuum punch 26. Specifically, FIGS. 4-13C will be used to describe various vacuum punches, bell and spigot preforms, and methods for using vacuum punches to deform and/or draw down an outer layer of polymer pipe near bell and spigot preforms.

In the manufacture of three-wall, corrugated, polymer pipe, it may be desirable to form an inline coupling portion by which two adjacent sections of the pipe may be severed and joined. For example, adjacent male and female coupling portions may be formed into the three walls of an in-line coupling preform for joining sections of continuously-extruded polymer pipe. The pipe may then be cut between adjacent male and female coupling portions of a coupling preform and then joined by inserting a male coupling portion into each female coupling portion.

Figure 4:
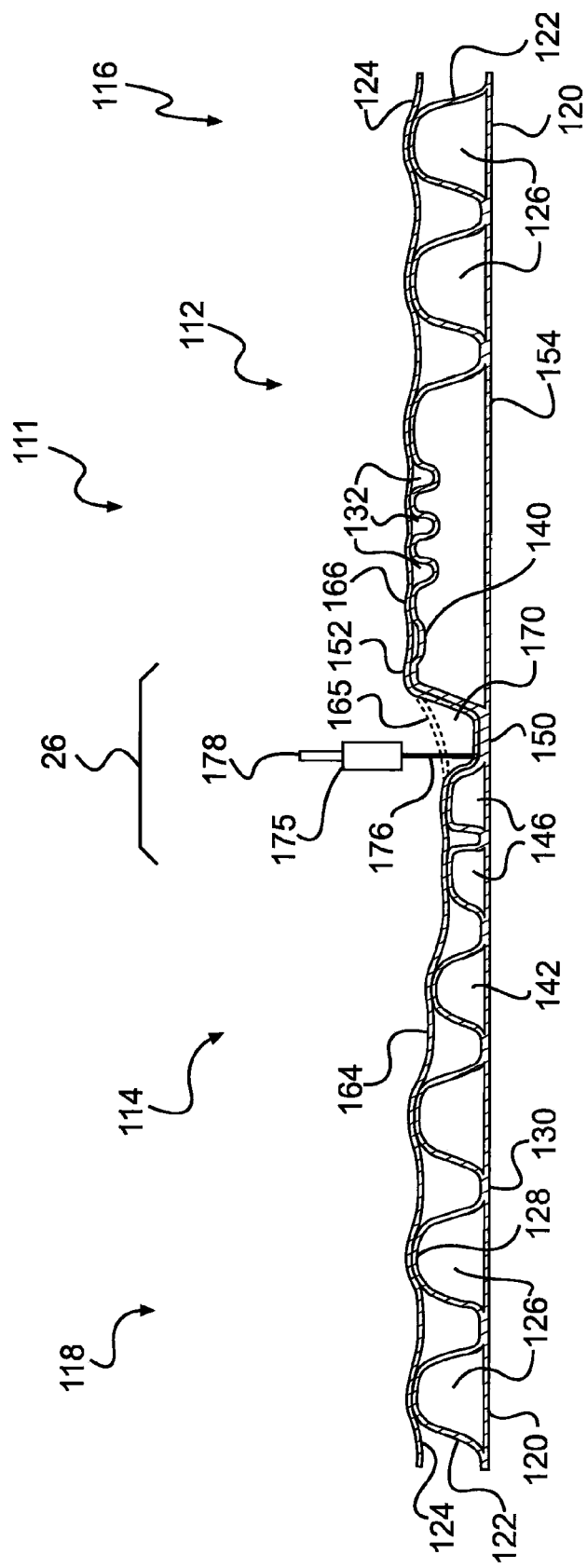
FIG. 4 is a partial, cross-sectional view of an exemplary coupling preform for joining two segments of three-wall, corrugated pipe, and a punch for deforming an outer wall of the three-wall, corrugated pipe.

FIG. 4 illustrates an exemplary, partial section of three-wall, corrugated pipe during manufacturing of an exemplary in-line coupling preform 111. The coupling preform 111 may have a bell portion 112 and a spigot portion 114 formed "in-line" with the rest of the three-wall corrugated pipe, after having been extruded from a cross-head die but before having been cut into separate portions. For example, three-wall corrugated pipe may be continuously manufactured into segments of pre-determined length (e.g. 10-30 feet), with adjacent segments 116, 118 having a coupling preform 111 formed therebetween. Each coupling preform 111 may then be severed between adjacent bell and spigot portions 112, 114, into pipe segments of the desired length, each having a bell portion 112 at one end and a spigot portion 114 at the other.

In the embodiment of FIG. 4, first and second corrugated pipe sections 116, 118 may be initially formed as dual-wall, corrugated pipe. For example, both first and second corrugated pipe sections 116, 118 may include an inner wall 120 and a corrugated wall 122, which may be co-extruded and then molded together on a corrugator. In another embodiment, inner wall 120 may be separately fused to the corrugated wall 122. The corrugated wall 122 may include a plurality of primary corrugations 126, each having respective primary corrugation crests 128 and primary corrugation valleys 130. This dual-wall, corrugated pipe may then be passed through a downstream, cross-head die, which extrudes an outer wall 124 onto the dual-wall pipe, as illustrated in FIG. 4, thereby creating three-wall, corrugated pipe. Because the outer wall 124 is extruded onto the corrugated wall 122 while it is still hot (i.e., in a melted or semi-melted state), it may be fused or cohesively bonded to primary corrugation crests 128 of the corrugated wall 122. In certain exemplary embodiments, the inner wall 120 may be substantially smooth, as illustrated in FIG. 4.

Referring in particular to the coupling preform 111, the bell portion 112 and the spigot portion 114 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 112, 114 as the outer diameter at various locations of primary corrugations 126.

Specifically, the bell portion 112 may include the outer wall 124 and a portion of corrugated wall 122 having smaller bell corrugations 132 formed therein. For example, bell portion 112 may include three bell corrugations 132, which are configured to engage and retain protrusions of a sealing gasket. Bell portion 112 may also include an end corrugation 140 disposed proximate to an end portion of the bell, i.e., between bell corrugations 132 and a bell terminus 152. As further illustrated in FIG. 4, the height of bell corrugations 132, measured from the outer wall 124 to the bottoms of the bell corrugations 132, may be substantially less than the primary height of primary corrugations 126, measured from the outer wall to the bottoms of the primary corrugations 126 (primary corrugation valleys 130). Moreover, the height of end corrugation 140, measured from the outer wall 124 to the bottom of end corrugation 140, may be even less than the height of bell corrugations 132. End corrugation 140 may have a different shape than that of primary corrugations 126 and bell corrugations 132. More specifically, end corrugation 140 may have a substantially rectangular shape. Because of the reduction in height of bell corrugations 132, without a change in outside pipe diameter, first corrugated pipe section 116 may form an in-line, bell-shaped portion for receiving spigot portion 114.

Spigot portion 114 may include inner wall 120, a portion of corrugated wall 122 having smaller spigot corrugations 146 formed therein, and a portion of outer wall 124 drawn down over spigot corrugations 146. Spigot portion 114 may also include an intermediate corrugation 142 disposed between spigot corrugations 146, located adjacent spigot terminus 150, and primary corrugations 126 of second corrugated pipe section 118. As illustrated in FIG. 4, the height of spigot corrugations 146, measured from inner wall 120 to the top of spigot corrugations 146, may be less than the height of intermediate corrugation 142, measured from inner wall 120 to the top of intermediate corrugation 142. Moreover, the height of intermediate corrugation 142 may be less than the height of primary corrugations 126. Thus, outer wall 124 may be circumferentially tapered over spigot portion 114. Because of the reduction in corrugation height in the direction approaching spigot terminus 150, a decreased-diameter spigot portion 114 may be formed so as to telescopically engage the bell portion 112. Upon proper dimensional control of bell portion 112 and spigot portion 114, a water-tight seal may be formed therebetween.

As illustrated in FIG. 4, when the outer wall 124 is extruded over the corrugated wall 122, it may have a tendency of draping naturally over adjacent corrugations, thereby forming closed cavities between the corrugated wall 122, the outer wall 124, and adjacent primary corrugations 126. In the vicinity of the coupling preform 111, in particular, the outer wall 124 may have an intermediate portion 165 that drapes between the spigot corrugations 146 and the bell terminus 152, thereby forming an annular closed cavity 170 between an adjacent spigot portion 114 and bell portion 112. If the intermediate portion 165 cools and sets as it naturally lays when extruded across the spigot terminus 150 (i.e., as shown in dashed lines), it may be difficult to cut the coupling preform 111 along the spigot terminus 150 for the purpose of separating adjoining pipe sections between adjacent bell portions 112 and spigot portions 114. Specifically, a cutter would need to sever: (1) the outer wall 124 and the corrugated wall 122 at the bell terminus 152, (2) the intermediate portion 165 of the outer wall 124 at the spigot terminus 150, (3) the corrugated wall 122 and the inner wall 120 at the spigot terminus 150; and (4) the inner wall 120 near an inner wall terminus 154. Moreover, a secondary operation would be needed to address the flap the would be left in the outer wall 124 adjacent to the spigot corrugations 146.

As a result, it may be desirable to draw the intermediate portion 165 of the outer wall 124 down against the corrugated wall 122 at the spigot terminus 150. Any suitable method may be used for drawing down the intermediate portion 165 of the outer wall 124 onto the corrugated wall 122 at the spigot terminus 150. In one embodiment, a vacuum may be applied to the closed cavity 170 to draw the intermediate portion 165 down against the spigot terminus 150. For example, a vacuum punch 175 may be disposed downstream from the cross-head die used to extrude outer wall 124 onto the corrugated wall 122. Accordingly, the vacuum punch 175 may be configured to contact and/or punch into the intermediate portion 165, punctures the intermediate portion 165, and draw a vacuum on the closed cavity 170, by evacuating hot air from the closed cavity 170 through the punched hole in the outer wall 124.

Vacuum punch 175 will be described herein in embodiments in which the punch penetrates into the outer wall 124, and in embodiments in which the punch punctures an opening in the outer wall 124 without penetrating into the outer wall 124. Thus, vacuum punch 175 will be described in relation to embodiments in which vacuum punch 175 includes a hollow needle, and in embodiments in which vacuum punch 175 does not include a hollow needle.

In one embodiment, as shown in FIG. 4, the vacuum punch 175 may include a hollow needle 176 configured to translate radially relative to the outer diameter of the outer wall 124 of the pipe. The hollow needle 176 may be disposed in communication with a vacuum source 178. Thus, when the hollow needle 176 of the vacuum punch 175 translates radially inward into the closed cavity 170, the vacuum punch 175 may draw a vacuum on the closed cavity 170. When a vacuum is drawn on the closed cavity 170, a pressure differential may form across the intermediate portion 165 of the outer wall 124. Specifically, the pressure in the closed cavity 170 may decrease relative to the pressure outside the outer wall 124. Such a pressure differential may create an inward force on the intermediate portion 165, thereby drawing the intermediate portion 165 down, or "inward", toward the corrugated wall 122 at the spigot terminus 150.

In order to advantageously draw down the intermediate portion 165, the vacuum punch 175 may penetrate the outer wall 124 and draw a vacuum on the closed cavity 170 once the pipe is cool enough for the polymer to be cleanly punctured yet warm enough to fully deform against the corrugated wall 122 under the force of the vacuum. Moreover, a plurality of vacuum punches 175 may be disposed radially, about the circumference of the corrugated pipe. For example, in one embodiment, two or four vacuum punches 175 may be disposed evenly about the circumference of the corrugated pipe. In an alternative embodiment, sixteen vacuum punches may be disposed evenly about the circumference of the corrugated pipe. Thus, a plurality of vacuum punches may evenly draw a vacuum at various locations around the annular closed cavity 170.

FIG. 4 also illustrates the intermediate portion 165 of the outer wall 124 after it has been drawn down over, and fused, welded, or cohesively bonded to, the corrugated wall 122 at the spigot terminus 150 (i.e., as shown in solid lines), such that the corrugated wall and outer wall are in contact between spigot portion 114 and bell portion 112 of coupling preform 111. Because the walls have been drawn down together, a scrap portion of coupling preform 111 (indicated by dashed lines in FIG. 5) may be easily removed by making cuts proximate to the spigot terminus 150, bell terminus 152, and inner wall terminus 154. Moreover, because the outer wall 124 has been fully drawn down against the end-most of the spigot corrugations 142, the spigot portion 114 is strengthened from having all three pipe walls present and joined at an end of the spigot portion 114. Still further, by drawing down the intermediate portion 165 onto the spigot terminus 150, the spigot portion 114 may be advantageously smoothed and tapered in a manner that facilitates the insertion of the spigot portion 114 into a bell portion 112 that has been fitted with a gasket.

Figure 5:
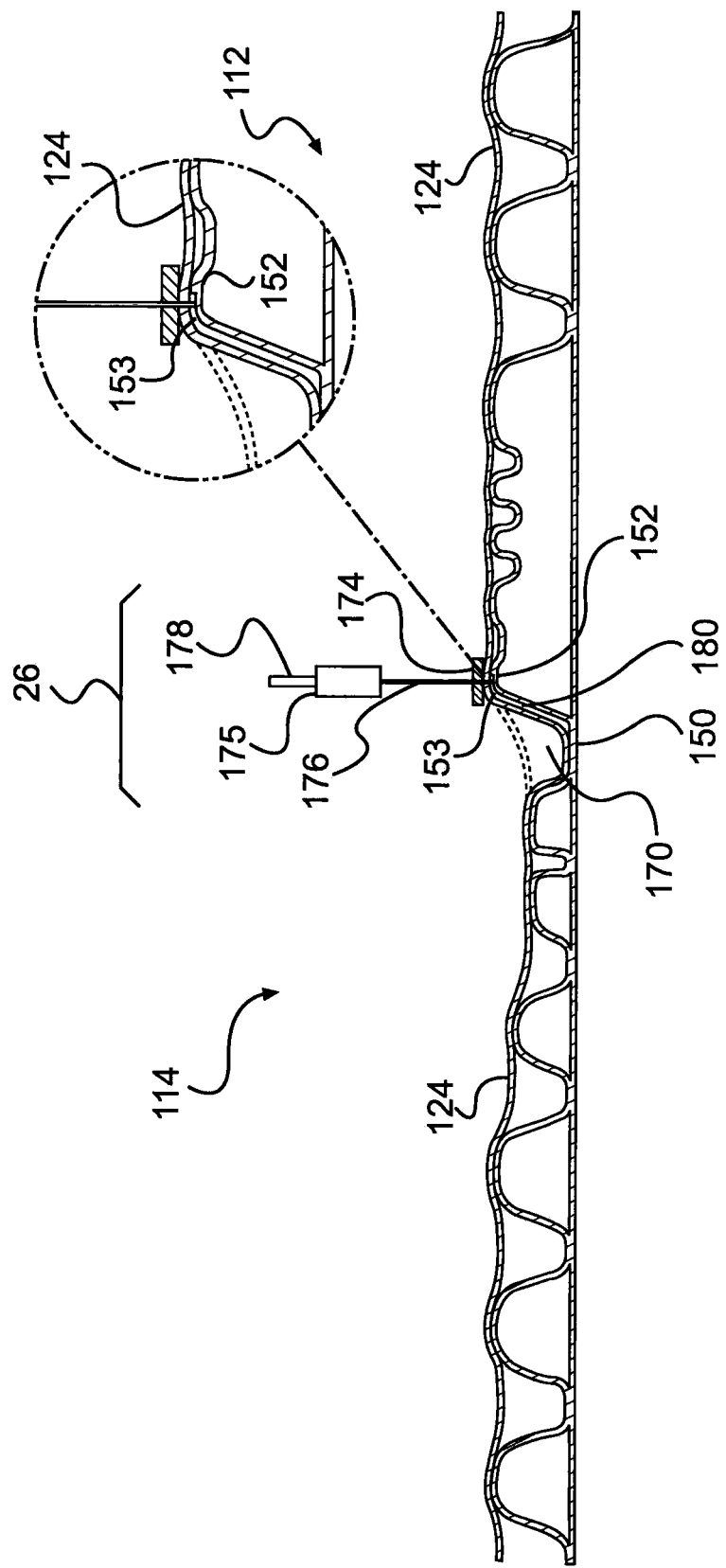
FIG. 5 is a partial, cross-sectional view of an alternative embodiment of an exemplary coupling preform for joining two segments of three-wall, corrugated pipe, and a punch for deforming an outer wall of the three-wall, corrugated pipe.

In another embodiment of the present disclosure, the vacuum punch 175 may be disposed over the bell terminus 152 rather than over the spigot terminus 150. For example, as illustrated in FIG. 5, the vacuum punch 175 may be configured to punch the outer wall 124 where its intermediate portion 165 contacts the end of the bell portion 112. In this embodiment, the vacuum punch 175 may be able to penetrate the outer wall 124 without having to travel as far inward radially toward the center of the closed cavity 170. However, in order to effect a vacuum in the closed cavity 170 by puncturing near the bell terminus 152 (instead of near the spigot terminus 150), a vacuum channel 180 may be formed in a portion of the corrugated wall 122 extending from the bell terminus 152 to the spigot terminus 150. As will be described more specifically with respect to FIG. 6, the vacuum channel 180 may be a groove in the corrugated wall 122 that preserves a fluid path between the outer wall 124 and the corrugated wall 122, extending from the closed cavity 170 at the spigot terminus 150 to a bell terminus gap 153.

FIG. 5 illustrates this embodiment in which the vacuum punch 175 punctures the outer wall 124 at the bell terminus gap 153. As a result, the vacuum source 178 of the vacuum punch 175 may draw a vacuum on the closed cavity 170 by inserting the hollow needle 176 into the top of the vacuum channel 180. As described with respect to FIG. 4, a plurality of vacuum punches 175 may be disposed radially, about the circumference of the corrugated pipe, and configured to puncture the outer wall 124 adjacent to the bell terminus 152. In such an embodiment, a vacuum channel 180 may be molded into the corrugated wall for every circumferential location at which a vacuum punch 175 is configured to puncture the outer wall 124 adjacent to the bell terminus 152.

As illustrated in FIG. 5, the vacuum punch 175 may also be fitted with a contact pad 174 around the hollow needle 176 in order to seal around an entry point of the hollow needle 176 into the outer wall 124. The contact pad 174 may be configured to ensure that a vacuum pressure drawn through the hollow needle 176 is fully transferred to the top of the vacuum channel 180, and therefore to the closed cavity 170. Moreover, the contact pad 174 may be configured to maintain the shape of the outer wall 124 around the hole formed in the outer wall 124 by the hollow needle 176, so as to prevent its deformation upon insertion and/or removal of the hollow needle 176. The contact pad 174 may be provided with its own vacuum source in order to maintain sealing contact between the contact pad 174 and the outer wall 124.

In order to form a plurality of the vacuum channels 180 into the corrugated wall 122, corresponding geometry may be incorporated into the molds used to shape the corrugated wall 122. When the inner wall 120 and corrugated wall 122 are co-extruded into a corrugator, the geometry of the molds translated in the corrugator may be used to define the geometry resulting in the corrugated wall 122. Specifically, such molds may include an outer surface defining a mold housing and an inner surface defining a mold cavity configured to shape the pipe. For example, a plurality of axially-recurring, transversely-annular crests and valleys formed in the cavity of a mold housing may form the corresponding crests and valleys desired in a corrugated wall 122 of corrugated dual-wall pipe. In molds configured to form coupling preform sections, a plurality of axially-arranged flanges may extend radially-inward into cavities of the corrugator molds in order to form corresponding grooves, or vacuum channels 180, in the outside of corrugated wall 122.

Figure 6:
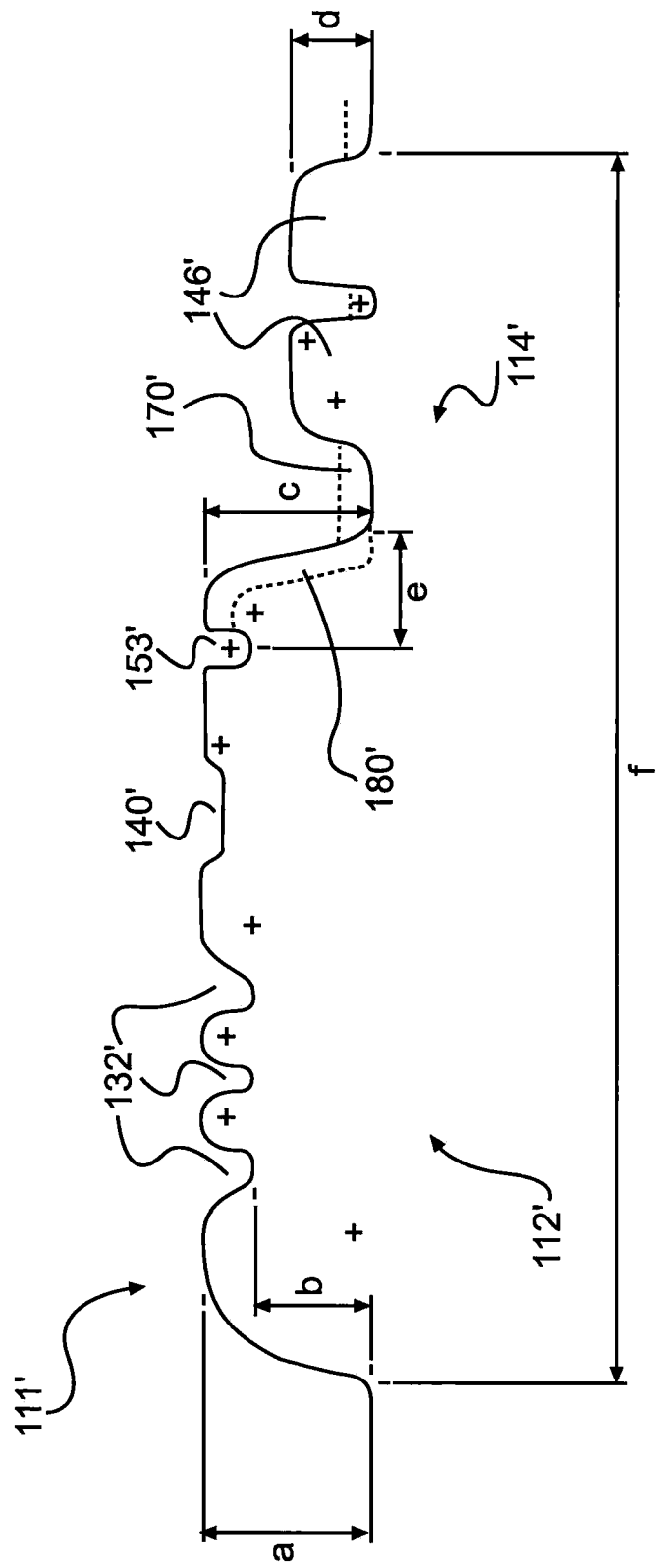
FIG. 6 is a partial, cross-sectional view of an exemplary mold profile for shaping a corrugated wall of the exemplary coupling preforms of FIGS. 4 and 5.

FIG. 6 illustrates an exemplary mold cavity geometry suitable for forming vacuum channels 180 in the corrugated wall 122 of a coupling preform 111, for example, as illustrated in FIG. 5. Specifically, FIG. 6 illustrates a coupling preform profile 111'. Coupling preform profile 111' may be formed into one of the corrugator molds in which a coupling preform 111 is desired to be formed. A mold having such a coupling preform profile 111' may be disposed at a predetermined interval of standard-shaped molds configured to form primary corrugations 126, having respective primary corrugation crests 128 and primary corrugation valleys 130. The exemplary disclosed coupling preform profile 111' may include a bell portion profile 112' having bell corrugation profiles 132' and a spigot portion profile 114' having spigot corrugation profiles 146'. The bell portion profile 112' may also include an end corrugation profile 140' and a bell terminus gap profile 153'. In order to form vacuum channels 180 in a corrugated wall 122 formed therein, the coupling preform profile 111' may also include a vacuum channel profile 180'.

The bell terminus gap profile 153' and vacuum channel profile 180' may modify the standard geometry of a mold in a way that creates a channel running from the upper bell terminus 152 of a corrugated wall 122 to the bottom of a closed cavity 170, which is formed when an outer wall 124 is extruded over the portion of corrugated wall 122 formed by a closed cavity profile 170' of the exemplary coupling preform profile 111'. Specifically, the bell terminus gap profile 153' and vacuum channel profile 180' may protrude into the mold cavity in which the corrugated wall 122 is molded, thereby forming an inwardly protruding bell terminus gap 153 and vacuum channel 180, as shown in FIG. 5. Moreover, as described above, the bell terminus gap profile 153' and vacuum channel profile 180' may be disposed at varying intervals radially about the circumference of a mold cavity to create a corresponding plurality of features in the corrugated wall 122.

In one embodiment, the coupling preform profile 111' may have a height "a" of approximately 2.0 to 4.0 inches and a length "f" of approximately 15.0 to 25.0 inches. The coupling preform profile 111' may also have an inner bell clearance "b" of approximately 1.0 to 3.0 inches, a channel height "c" of approximately 3.0 inches, a channel length "e" of approximately 2.0 inches, and a spigot corrugation height "d" of approximately 1.0 to 2.0 inches. However, it will be appreciated by one of skill in the art that any specific mold geometry may be used to create vacuum channels 180 in the corrugated wall 122, or any other wall of pipe, as desired. Accordingly, any suitable vacuum channels may be integrally formed in the multi-wall pipe in a manner that facilitates the drawing of a vacuum from a radially-disposed vacuum punch into any closed cavity in the pipe. For example, additional special vents may be formed in the corrugated wall 122 for the purpose of extending fluid communication of a vacuum from the vacuum channel 180 to the spigot corrugations 146.

Figure 7:
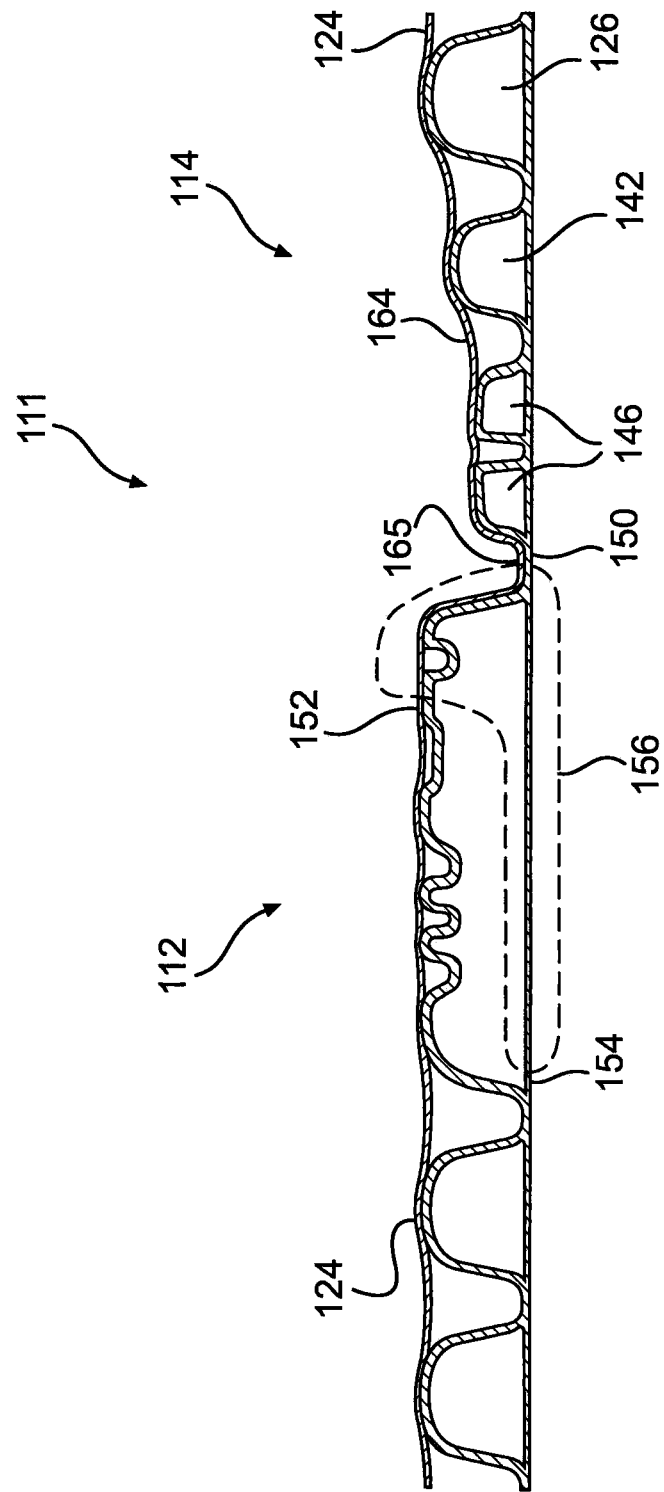
FIG. 7 is a partial, cross-sectional view of an exemplary three-wall, corrugated pipe having a coupling preform molded therein, which can be severed into an in-line bell and spigot coupling.
Figure 8:
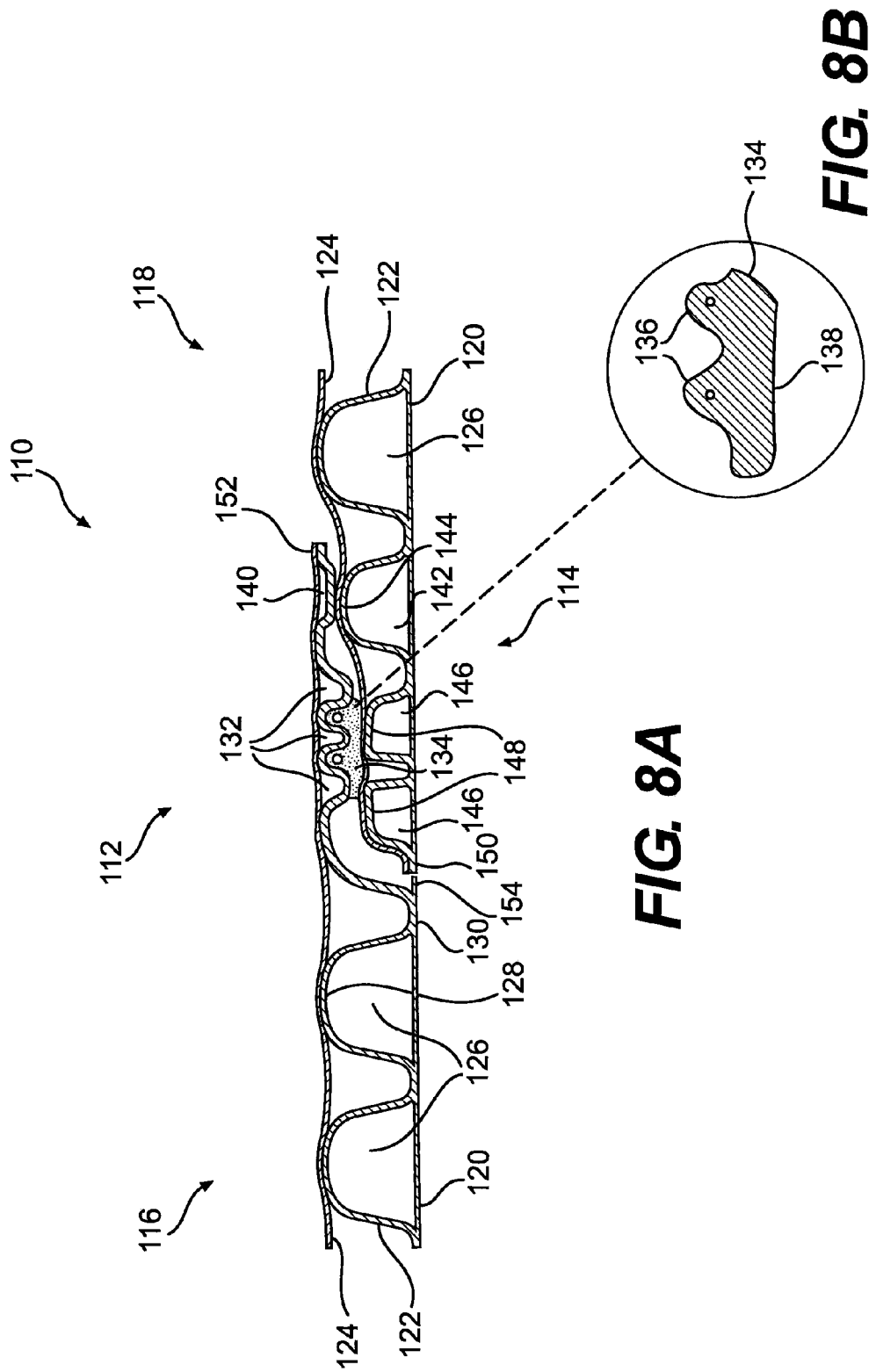
FIG. 8A is a partial, cross-sectional view of an exemplary in-line bell and spigot coupling for joining two segments of three-wall, corrugated pipe.
FIG. 8B is a cross-sectional view of an exemplary gasket for use in the in-line bell and spigot coupling of FIG. 8A.
Figure 9:
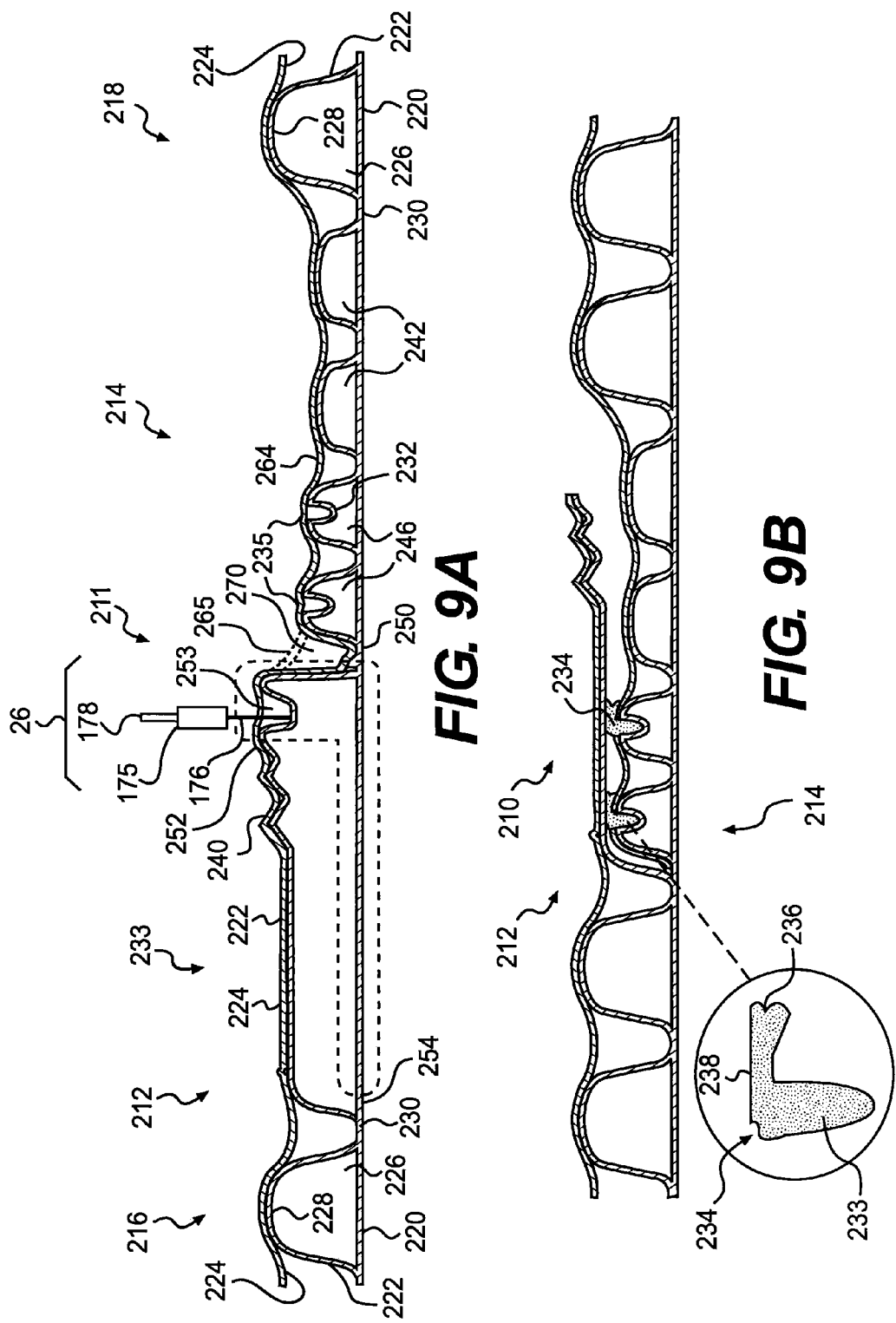
FIG. 9A is a partial, cross-sectional view of an alternative embodiment of an exemplary coupling preform for joining two segments of three-wall, corrugated pipe, and a punch for deforming an outer wall of the three-wall, corrugated pipe.
FIG. 9B is a partial, cross-sectional view of an alternative embodiment of an exemplary in-line bell and spigot coupling for joining two segments of three-wall, corrugated pipe.

FIG. 7 illustrates the intermediate portion 165 of the outer wall 124 once it has been drawn down over, and fused, welded, or cohesively bonded to, the corrugated wall 122 at the spigot terminus 150, such that all three walls of the corrugated pipe are in contact between spigot portion 114 and bell portion 112 of coupling preform 111. Because the walls have been drawn down together, a scrap portion of coupling preform 111 (indicated by dashed lines) may be easily removed by making cuts proximate to the spigot terminus 150, bell terminus 152, and inner wall terminus 154. The need for only a single cut of the three walls at the spigot terminus 150 may eliminate the need for additional processing steps for removing excess outer wall 124 near the bell terminus 152. Moreover, because the outer wall 124 has been fully drawn down against the end-most of the spigot corrugations 142, the spigot portion 114 is strengthened from having all three pipe walls present and joined at an end of the spigot portion 114. Still further, by drawing down the intermediate portion 165 onto the spigot terminus 150, the spigot portion 114 may be advantageously smoothed and tapered in a manner that facilitates the insertion of the spigot portion 114 into a bell portion 112 that has been fitted with a gasket.

FIG. 8A illustrates an exemplary coupling portion 110 that has been created by severing the coupling preform 111 as illustrated by the dashed lines in FIG. 7. Coupling portion 110 may then be configured to couple a first corrugated pipe section 116 and a second corrugated pipe section 118. In general, coupling portion 110 may include a bell portion 112 disposed on an end of the first corrugated pipe section 116 and a spigot portion 114 disposed on an end of the second corrugated pipe section 118. Coupling portion 110 may also include a gasket 134, for retaining and sealing spigot portion 114 within bell portion 112.

In the embodiment of FIG. 8A, gasket 134 engages a surface of outer wall 124 spanning two spigot corrugations 146. In alternative embodiments of the present disclosure, it is contemplated that gasket 134 may be configured to engage only one spigot corrugation 146 or many spigot corrugations 146. For example, in the event that gasket 134 engages a single spigot corrugation 146, it may be necessary to fill the corrugation with foam, or any other suitable reinforcing material to ensure sufficiently resilient support of gasket 134. For this reason, two smaller spigot corrugations 148, such as those illustrated in FIG. 8A, may be used to provide increased structural support (i.e., vertical corrugation walls) for sealing against gasket 134. Moreover, the length of sealing engagement between gasket 134 and outer wall 124 of spigot portion 114 may be any suitable length; however, in one exemplary embodiment, spigot corrugations 146 extend axially across 4-8 inches of pipe and are fused to a portion of outer wall 124. Gasket 134 may extend and overlap approximately 3-4 inches in the axial pipe direction of the portion of outer wall 124 fused to spigot corrugations 146, gasket 134 having a sealing surface 38 approximately 2-4 inches long. Thus, sealing surface 38 of gasket 134 may be configured to engage the outer wall 124 of spigot portion 114.

Gasket 134 may be any suitable type of annular, water-tight gasket. For example, gasket 134 may be a dual-elastomer gasket including any suitable type of material, such as rubber, polyethylene, Teflon, EPDM, nitrile, thermoplastic elastomers, isoprene, or other plastic compounds. Gasket 134 may also incorporate various metal inserts or rings, as necessary, to provide structural rigidity.

Although FIGS. 4, 5, 7, and 8A-8B illustrate one particular exemplary embodiment of the present disclosure, it will be appreciated by one of skill in the art that numerous other variations on the geometry of cooperating in-line bell and spigot portions are contemplated within the scope of this disclosure. Specifically, the vacuum punch and related methods disclosed herein may be applicable to the deformation of an outer wall of any geometry of corrugated pipe or coupling preform. For example, FIGS. 9A and 9B illustrate an alternative exemplary embodiment of cooperating in-line bell and spigot portions having alternative geometries for retaining one of more gaskets between in-line bell and spigot portions.

FIG. 9A illustrates an exemplary, partial section of three-wall, corrugated pipe during manufacturing of an exemplary in-line coupling preform 211. The coupling preform 211 may have a bell portion 212 and a spigot portion 214 formed "in-line" with the rest of the three-wall corrugated pipe, after having been extruded from a cross-head die but before having been cut into separate portions. For example, three-wall corrugated pipe may be continuously manufactured into segments of pre-determined length (e.g., 10-30 feet), with adjacent segments 216, 218 having a coupling preform 211 formed therebetween. Each coupling preform 211 may then be severed between adjacent bell and spigot portions 212, 214, into pipe segments of the desired length, each having a bell portion 212 at one end and a spigot portion 214 at the other.

In the embodiment of FIG. 9A, first and second corrugated pipe sections 216, 218 may be initially formed as dual-wall, corrugated pipe. For example, both first and second corrugated pipe sections 216, 218 may include an inner wall 220 and a corrugated wall 222, which may be co-extruded and then molded together on a corrugator. In another embodiment, inner wall 220 may be separately fused to the corrugated wall 222. The corrugated wall 222 may include a plurality of primary corrugations 226, each having respective primary corrugation crests 228 and primary corrugation valleys 230. This dual-wall, corrugated pipe may then be passed through a downstream, cross-head die, which extrudes an outer wall 224 onto the dual-wall pipe, as illustrated in FIG. 9A, thereby creating three-wall, corrugated pipe. Because the outer wall 224 is extruded onto the corrugated wall 222 while outer wall 224 is still hot (i.e., in a melted or semi-melted state), outer wall 224 may be fused or cohesively bonded to primary corrugation crests 228 of the corrugated wall 222. In certain exemplary embodiments, inner wall 220 may be substantially smooth, as illustrated in FIG. 9A.

Referring in particular to the coupling preform 211, the bell portion 212 and the spigot portion 214 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 212, 214 as the outer diameter at various locations of primary corrugations 226.

As illustrated in FIG. 9A, bell portion 212 may include outer wall 224 and a portion of corrugated wall 222 joined together along a substantially straight sealing portion 233. Specifically, bell portion 212 may include a sealing portion 233 configured to engage and retain sealing surfaces 238 of gaskets 234 with an inner surface of corrugated wall 222, as illustrated in the detail view of FIG. 9B. Because bell portion 212 may include both outer wall 224 and corrugated wall 222 fused together along sealing portion 233, bell portion 212 may have increased strength and resistance to deformation as compared to a single layer bell portion. Bell portion 212 may also include one or more end corrugations 240 disposed proximate to an end portion of the bell, i.e., between sealing portion 233 and bell terminus 252.

Spigot portion 214 may include inner wall 220, a portion of corrugated wall 222 having spigot corrugations 246 formed therein, and a portion of outer wall 224 drawn down over spigot corrugations 246. Spigot portion 214 may also include intermediate corrugations 242 disposed between spigot corrugations 246, located adjacent spigot terminus 250, and primary corrugations 226 of second corrugated pipe section 218. As illustrated in FIG. 9A, the height of spigot corrugations 246, measured from inner wall 220 to the top of spigot corrugations 246 may be greater than the height of intermediate corrugations 242, measured from inner wall 220 to the top of intermediate corrugations 242. However, the height of spigot corrugations 246 may be less than the height of primary corrugations 226. Thus, a portion of outer wall 224 disposed around intermediate corrugations 242 may be the smallest diameter portion of the pipe, such that first corrugated pipe section 216 can articulate relative to second corrugated pipe section 218 without contact interference between bell terminus 252 and the portion of outer wall 224 fused to intermediate corrugations 242.

As illustrated in the embodiment of FIG. 9A, primary corrugations 226 and intermediate corrugations 242 may have generally curved shapes, including rounded shoulder portions. Likewise, spigot corrugations 246 may have generally curved profile shapes. However, spigot corrugations 246 may each include a groove 232 formed around its circumference. As shown in FIG. 9A, the portions 235 of outer wall 224 extending over grooves 232 may be removed, such that an engagement projection 233 of each gasket 234 may be inserted into a groove 232 of a spigot corrugation 246. Because outer wall 224 extends over and is fused to spigot corrugations 246 and intermediate corrugations 242 along their lengths, except at portions 235 over grooves 232, spigot portion 214 may have increased strength and resistance to deformation as compared to a spigot portion having only two walls. In the embodiment of FIG. 9A, spigot portion 214 includes two spigot corrugations 246, each having a gasket 234 inserted into its respective groove 232. However, it will be appreciated that spigot portion 214 may have any number of spigot corrugations 246. Moreover, each spigot corrugation 246 may be provided with any number of grooves 232 and gaskets 234, as desired. Spigot corrugations 246 may also be reinforced by the injection of foam into an interior of each of spigot corrugations 246. Because of the reduction in corrugation height of spigot corrugations 246 relative to primary corrugations 126, a decreased-diameter spigot portion 214 may be formed so as to telescopically engage the bell portion 212. Specifically, upon proper dimensional control of bell portion 212 and spigot portion 214, a water-tight seal may be formed therebetween.

As illustrated in FIG. 9A, when the outer wall 224 is extruded over the corrugated wall 222, outer wall 224 may have a tendency of draping naturally over adjacent corrugations, thereby forming closed cavities between the corrugated wall 222, the outer wall 224, and adjacent primary corrugations 226. In the vicinity of the coupling preform 211, in particular, the outer wall 224 may have an intermediate portion 265 that drapes between the spigot corrugations 246 and the bell terminus 252, thereby forming an annular closed cavity 270 between an adjacent spigot portion 214 and bell portion 212. If the intermediate portion 265 cools and sets as it naturally lays when extruded across the spigot terminus 250 (i.e., as shown in dashed lines), it may be difficult to cut the coupling preform 211 along the spigot terminus 250 for the purpose of separating adjoining pipe sections between adjacent bell portions 212 and spigot portions 214. Specifically, a cutter would need to sever: (1) the outer wall 224 and the corrugated wall 222 at the bell terminus 252, (2) the intermediate portion 265 of the outer wall 224 at the spigot terminus 250, (3) the corrugated wall 222 and the inner wall 220 at the spigot terminus 250; and (4) the inner wall 220 near an inner wall terminus 254. Moreover, a secondary operation would be needed to address the flap the would be left in the outer wall 224 adjacent to the spigot corrugations 246.

As a result, it may be desirable to draw the intermediate portion 265 of the outer wall 224 down against the corrugated wall 222 at the spigot terminus 250. Any suitable method may be used for drawing down the intermediate portion 265 of the outer wall 224 onto the corrugated wall 222 at the spigot terminus 250. As described with respect to the embodiment of FIG. 3, a vacuum may be applied to closed cavity 270 to draw the intermediate portion 265 down against the spigot terminus 250. For example, a vacuum punch 175 may be disposed downstream from the cross-head die used to extrude outer wall 224 onto the corrugated wall 222. Accordingly, the vacuum punch 175 may be configured to punch into the intermediate portion 265 and draw a vacuum on the closed cavity 270, by evacuating hot air from the closed cavity 270 through the punched hole in the outer wall 224.

However, as shown in the exemplary embodiment of FIG. 9A, the vacuum punch 175 may also be disposed adjacent to the bell terminus 252 rather than over the spigot terminus 250. For example, as illustrated in FIG. 9A, the vacuum punch 175 may be configured to punch the outer wall 224 where its intermediate portion 265 contacts the end of the bell portion 212. In this embodiment, the vacuum punch 175 may be able to penetrate the outer wall 224 without having to travel as far inward radially toward the center of the closed cavity 270. However, in order to effect a vacuum in the closed cavity 270 by puncturing near the bell terminus 252 (instead of near the spigot terminus 250), a vacuum channel may be formed in a portion of the corrugated wall 222 extending from the bell terminus 252 to the spigot terminus 250. As will be described more specifically with respect to FIG. 10, a vacuum channel 380 may be formed as a groove in the corrugated wall 222 that preserves a fluid path between the outer wall 224 and the corrugated wall 222, extending from the bell terminus gap 253 at bell terminus 252 to the closed cavity 270 at spigot terminus 250.

FIG. 9A illustrates this embodiment in which the vacuum punch 175 punctures the outer wall 224 at the bell terminus gap 253. As a result, the vacuum source 178 of the vacuum punch 175 may draw a vacuum on the closed cavity 270 by inserting the hollow needle 176 into the top of the vacuum channel 280 illustrated in FIG. 10. As described with respect to FIG. 3, a plurality of vacuum punches 175 may be disposed radially, about the circumference of the corrugated pipe, and configured to puncture the outer wall 224 adjacent to the bell terminus 252. In such an embodiment, a vacuum channel 280 may be molded into the corrugated wall for every circumferential location at which a vacuum punch 175 is configured to puncture the outer wall 224 adjacent to the bell terminus 252.

FIG. 9A also illustrates the intermediate portion 265 of the outer wall 224 after it has been drawn down over, and fused, welded, or cohesively bonded to, the corrugated wall 222 at the spigot terminus 250 (i.e., as shown in solid lines), such that all three walls of the corrugated pipe are in contact between spigot portion 214 and bell portion 212 of coupling preform 211. Because the walls have been drawn down together, a scrap portion of coupling preform 211 (indicated by dashed lines in FIG. 9A) may be easily removed by making cuts proximate to the spigot terminus 250, bell terminus 252, and inner wall terminus 254. Moreover, because the outer wall 224 has been fully drawn down against the end-most of the spigot corrugations 242, the spigot portion 214 is strengthened from having all three pipe walls present and joined at an end of the spigot portion 214. Still further, by drawing down the intermediate portion 265 onto the spigot terminus 250, the spigot portion 214 may be advantageously smoothed and tapered in a manner that facilitates the insertion of the spigot portion 214 into a bell portion 212, once spigot portion 214 has been fitted with a gasket.

FIG. 9B illustrates an exemplary coupling portion 210 that has been created by severing the coupling preform 211 as illustrated by the dashed lines in FIG. 9A. Coupling portion 210 may then be configured to couple a first corrugated pipe section 216 and a second corrugated pipe section 218. In general, coupling portion 210 may include a bell portion 212 disposed on an end of the first corrugated pipe section 216 and a spigot portion 214 disposed on an end of the second corrugated pipe section 218. Coupling portion 210 may also include at least one gasket 234, for retaining and sealing spigot portion 214 within bell portion 212.

For instance, referring to both FIG. 9A and the detail of FIG. 9B, a sealing surface 238 of each gasket 234 may contact a sealing portion 233 of corrugated wall 222 fused to outer wall 224. Because corrugated wall 222 is smoothed against outer wall 224 along sealing portion 233, each gasket 234 may be disposed at a substantially similar diameter of spigot portion 214. However, if sealing portion 233 is profiled so as to change diameters along its length, then gaskets 234 may be disposed at corresponding diameters so as to ensure their sealing engagement with corrugated wall 222. The length of sealing engagement between gaskets 234 and corrugated wall 222 may be any suitable length; however, in one exemplary embodiment, spigot corrugations 246 may extend axially across 2-8 inches of pipe. Gaskets 234 may also extend and overlap approximately 2-8 inches in the axial pipe direction, each gasket 234 having a sealing surface 238 approximately 1-4 inches long. Thus, sealing surfaces 238 of each gasket 134 may be configured to engage the corrugated wall 222 of sealing portion 233 of bell portion 212.

Each gasket 234 may be any suitable type of annular, water-tight gasket. For example, gasket 234 may be dual-elastomer gaskets including any suitable type of material, such as rubber, polyethylene, Teflon, EPDM, nitrile, thermoplastic elastomers, isoprene, or other plastic compounds. Gasket 234 may also incorporate various metal inserts or rings, as necessary, to provide structural rigidity. As shown in the detail of FIG. 9B, each gasket 234 may include a V-shaped shoulder 236 configured to ease insertion of spigot portion 214 into bell portion 212 by minimizing the likelihood of rotating gasket 234. For example, each gasket 234 may be selected from one of the gasket types disclosed in U.S. Pat. No. 6,948,718 issued to William V. Shaffer and William C. Andrick on Sep. 27, 2005; U.S. Pat. No. 7,331,582 issued to William V. Shaffer and William C. Andrick on Feb. 19, 2008; or U.S. Pat. No. 7,185,894 issued to Kevin S. Kish and Pardeep K. Sharma on Mar. 6, 2007, (all assigned to Advanced Drainage Systems, Inc.), each of which are incorporated herein by reference.

Figure 10:
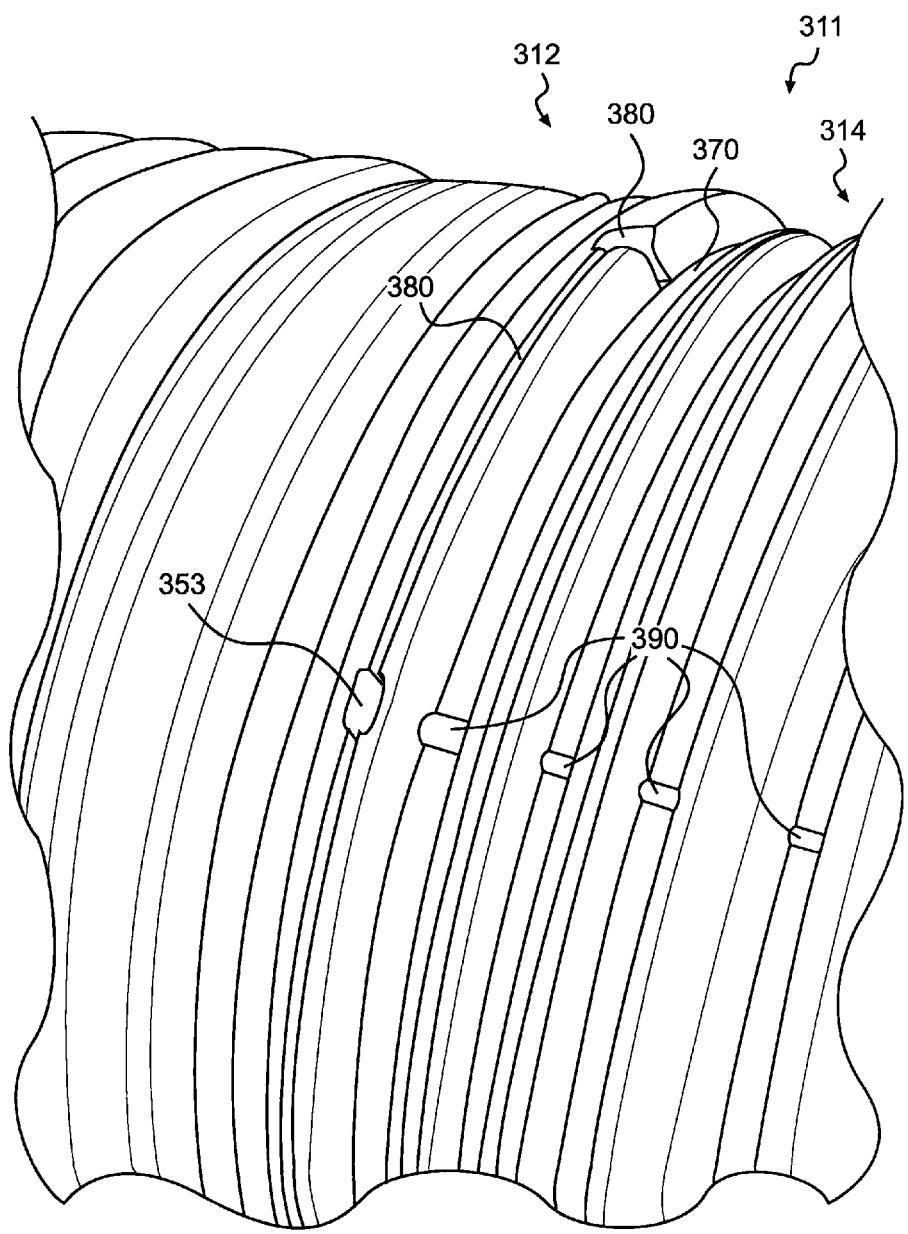
FIG. 10 is a partial, perspective view of the exemplary coupling preform of FIG. 9A before the outer wall has been extruded onto the dual-wall coupling perform.

FIG. 10 illustrates a partial, perspective view of the exemplary coupling preform 311 of FIG. 9A before the outer wall 124, 224 has been extruded onto the dual-wall coupling preform. The coupling preform 311 may include a bell portion 312 and a spigot portion 314. As described with respect to FIG. 9A, bell portion 312 may include a bell terminus gap 353 into which vacuum punch 175 may be inserted after outer wall 124, 224 is extruded onto the corrugated wall 122, 222. Bell portion 312 may further include a vacuum channel 380 that provides a fluid passage from terminus gap 353 to closed cavity 370. Thus, vacuum punch 175 may be used to draw outer wall 124, 224 down against corrugated wall 122, 222 by insertion of the hollow needle 176 into the top of the vacuum channel 380, ultimately drawing a vacuum on closed cavity 370. As described with respect to FIGS. 4-6, any additional vacuum channels may be integrally formed in the multi-wall pipe in a manner that facilitates the drawing of a vacuum from a radially-disposed vacuum punch into any closed cavity in the pipe. For example, additional special vents 390 may be formed in the corrugated wall 222 for the purpose of venting volumes between the corrugated wall and the inner wall.

FIGS. 11-13C will depict various embodiments of vacuum punches (variously numbered 26, 175, 475, 500, 600 throughout this application). Any of the punches 175, 475, 500, 600 may be incorporated as vacuum punch 26 in system 10 of FIG. 1. Thus, any of the punches 175, 475, 500, 600 may be positioned as shown in FIGS. 4, 5, and/or 9A.

Figure 11:
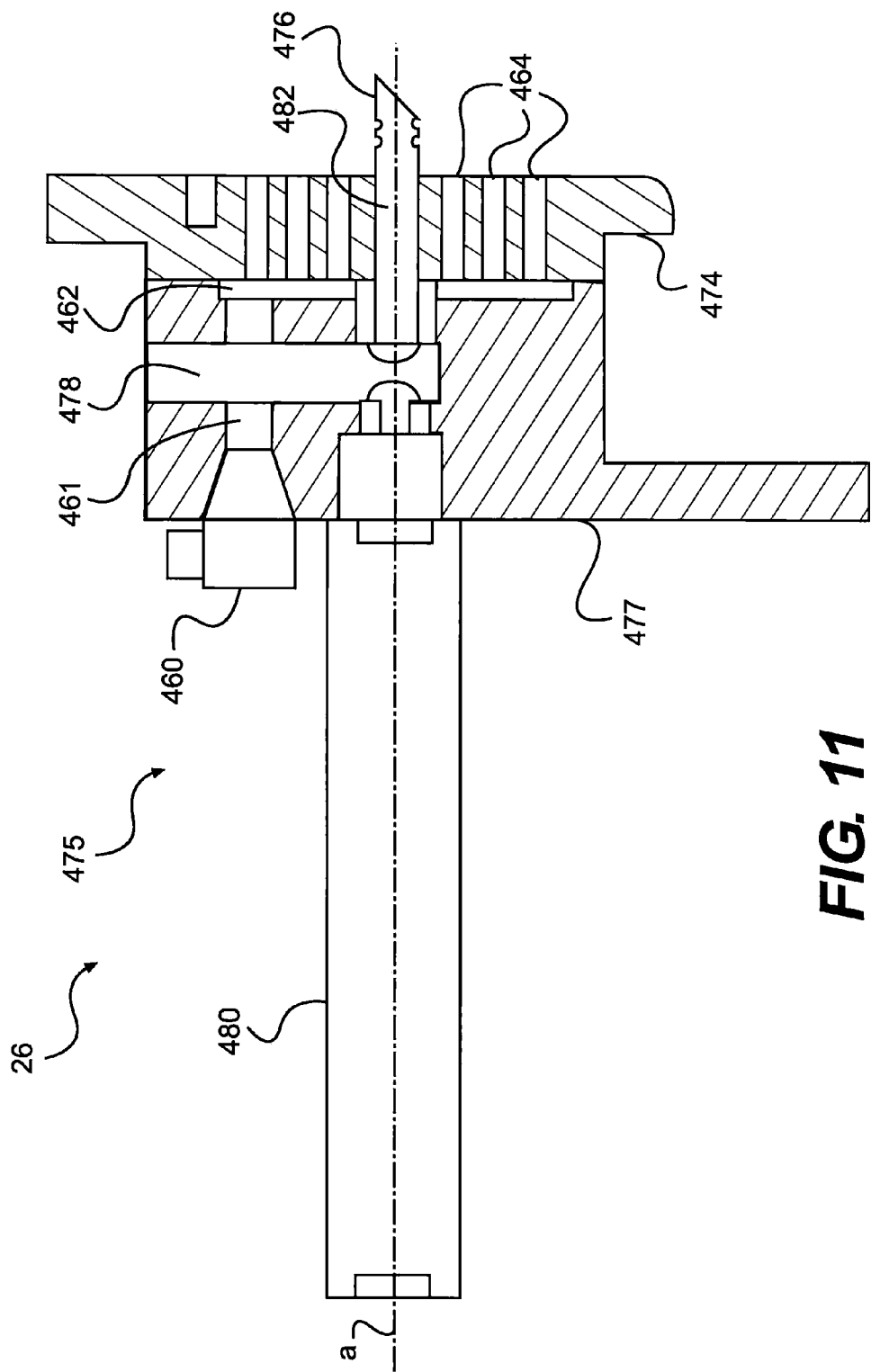
FIG. 11 is a cross-sectional view of an exemplary punch for deforming an outer wall of the exemplary coupling preforms of FIGS. 4 and 5.

FIG. 11 illustrates a cross-section of an exemplary vacuum punch 475 suitable for use in deforming an outer wall of a corrugated polymer pipe, as described above with respect to FIGS. 4-10. In general, the exemplary vacuum punch 475 may include a punch housing 477 and a punch actuator 480 connected to a hollow needle 476. The hollow needle 476 may have a vacuum conduit 482 therein, which may be selectively translated into fluid communication with a vacuum source 478, when translated along axis "a" by the punch actuator 480.

The vacuum punch 475 may also be provided with an exemplary contact pad 474 around the hollow needle 476. The contact pad 474 may have a plurality of contact pad vacuum holes 464 disposed in communication with a contact pad gap 462 formed in a lower end of the punch housing 477. The punch housing 477 may also have a contact pad vacuum conduit 461 formed therein and configured to facilitate fluid communication between the contact pad gap 462 and a contact pad vacuum supply 460. Accordingly, the contact pad vacuum supply 460 may be configured to draw a vacuum on the contact pad vacuum holes 464 via the contact pad vacuum conduit 461 and the contact pad gap 462.

In operation, a plurality of vacuum punches, such as the exemplary vacuum punch 475, may be disposed downstream from a cross-head die that is configured to continuously-extrude an outer wall of polymer onto a corrugated dual-wall pipe passing through the cross-head die, in order to form three-wall pipe. The plurality of vacuum punches may be arranged radially about the circumference of the three-wall pipe. As described above, the three-wall pipe may have a coupling preform portion disposed in-line with the three-wall pipe at a pre-determined interval corresponding to a desired length of each pipe segment to be severed from the continuously-extruded pipe. As each coupling preform portion exits the cross-head die, the plurality of vacuum punches may be engaged, so as to puncture an outer wall of the three-wall pipe. For example, the vacuum punches may puncture the outer wall at a spigot terminus, as described with respect to FIG. 4. Alternatively, the vacuum punches may puncture the outer wall at a bell terminus, as described with respect to FIGS. 5 and 9A.

Referring to FIG. 11, the contact pad 474 of each vacuum punch 475 may be brought in contact with a portion of the outer wall. The contact pad vacuum supply 460 may apply a vacuum to the contact pad 474 via the contact pad vacuum conduit 461 and the contact pad gap 462. The punch actuator 480 may then cause the hollow needle 476 to translate radially-inward towards a centerline of the three-wall pipe, so as to puncture the outer wall and bring the vacuum conduit 482 in fluid communication with the vacuum source 478. The vacuum source 478 may then apply a vacuum to an area engaged by the hollow needle 476, such as the closed cavity as described with respect to FIG. 4 or the bell terminus gap as described with respect to FIG. 5. As a result of the vacuum, the intermediate portion of the outer wall may be drawn down from its original orientation (as shown in the dotted lines of FIGS. 4 and 5) such that it collapses and welds to the corrugated wall at the spigot terminus (as shown in the solid lines of FIGS. 4 and 5).

Figure 12A:
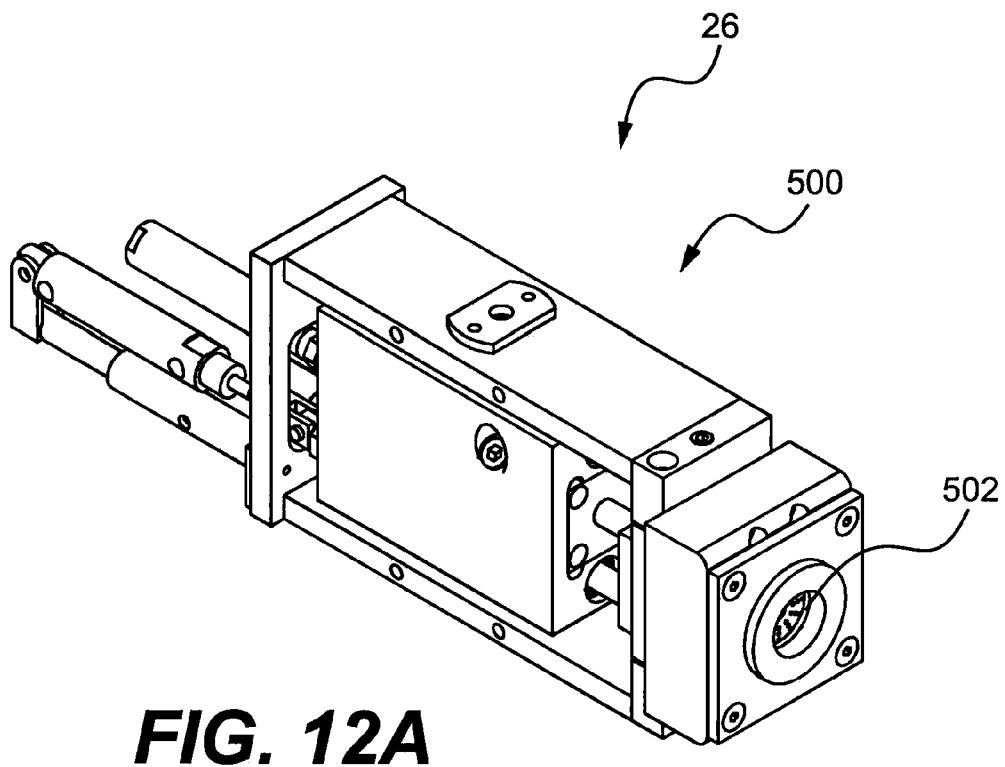
FIG. 12A is a perspective view of another exemplary punch for deforming an outer wall of the exemplary coupling performs.
Figure 12B:
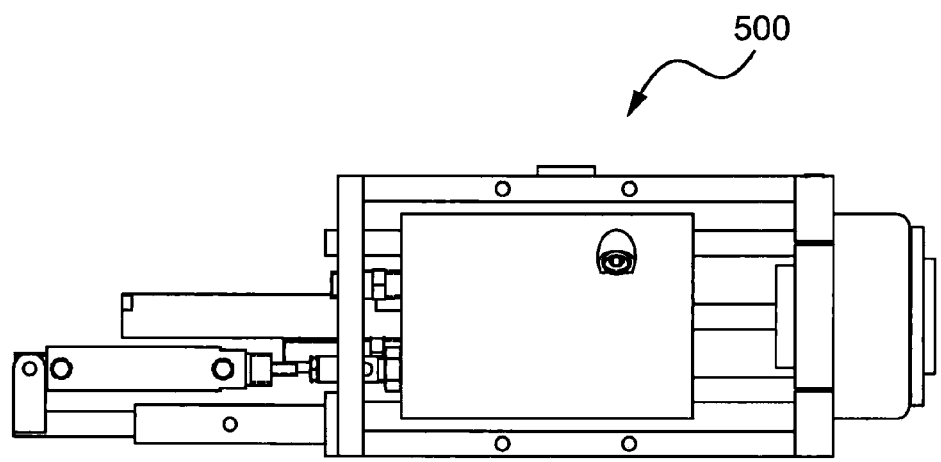
FIG. 12B is a side view of the exemplary punch of FIG. 12A.
Figure 12C:
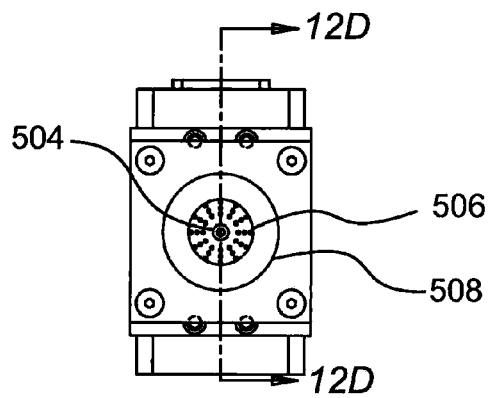
FIG. 12C is a front view of the exemplary punch of FIG. 12A.
Figure 12D:
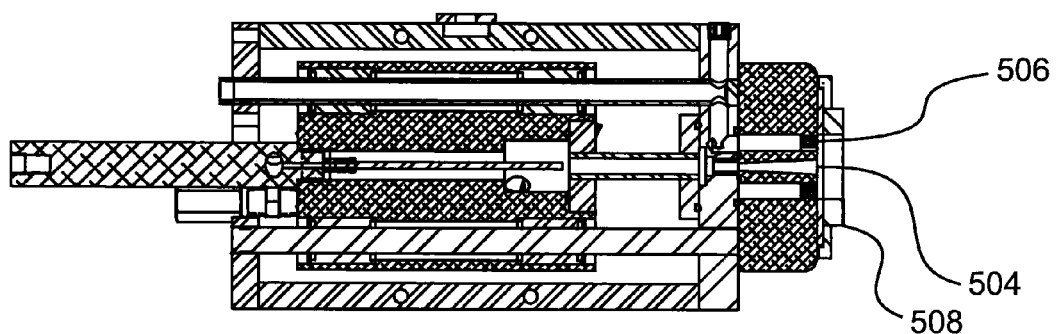
FIG. 12D is a cross-sectional side view of the exemplary punch of FIG. 12A.

FIG. 12A is a perspective view of another exemplary embodiment of a punch 500 for deforming an outer wall of the exemplary coupling performs, wherein the punch does not necessarily include a hollow needle configured for insertion into the outer wall. In particular, punch 500 includes a vacuum device 502 that is configured to draw a vacuum when pressed against the outer wall of pipe. FIG. 12B is a side view of the exemplary punch of FIG. 12A, and FIG. 12C is a front view of the exemplary punch of FIG. 12A. As shown in FIG. 12C, punch 500 may include a foam, rubber ring 508, which is configured to be pressed against outer wall when punch 500 is conveyed radially toward a pipe. Punch 500 may also include a vacuum passage 504 and a perforated, vacuum pad 506 disposed in the middle of ring 508. In one embodiment, vacuum passage 504 may be a circular opening in the middle of vacuum device 502, while vacuum pad 506 and ring 508 may be disposed in consecutive, concentric, rings about vacuum passage 504. Punch 500 may be disposed in communication with a vacuum pump and configured to draw a vacuum on the perforations in vacuum pad 506 as well as the vacuum passage 504. Thus, in operation, punch 500 may be conveyed radially inward toward a newly-manufactured section of three wall pipe, such that ring 508 presses against an outer wall of the pipe. Punch 500 may then be actuated to draw a vacuum through vacuum pad 506 and vacuum passage 504, so as to create a pressure differential across the outer wall, which results in a thinning, and ultimately a puncturing of the outer wall. FIG. 12D is a cross-sectional side view of the exemplary punch of FIG. 12A, which illustrates the internal configuration of punch 500. As shown in FIG. 12D, vacuum passage 504 may be slightly conical, or frustro-conical, such that it widens in diameter in a direction toward the outer pipe wall.

Figure 13A:
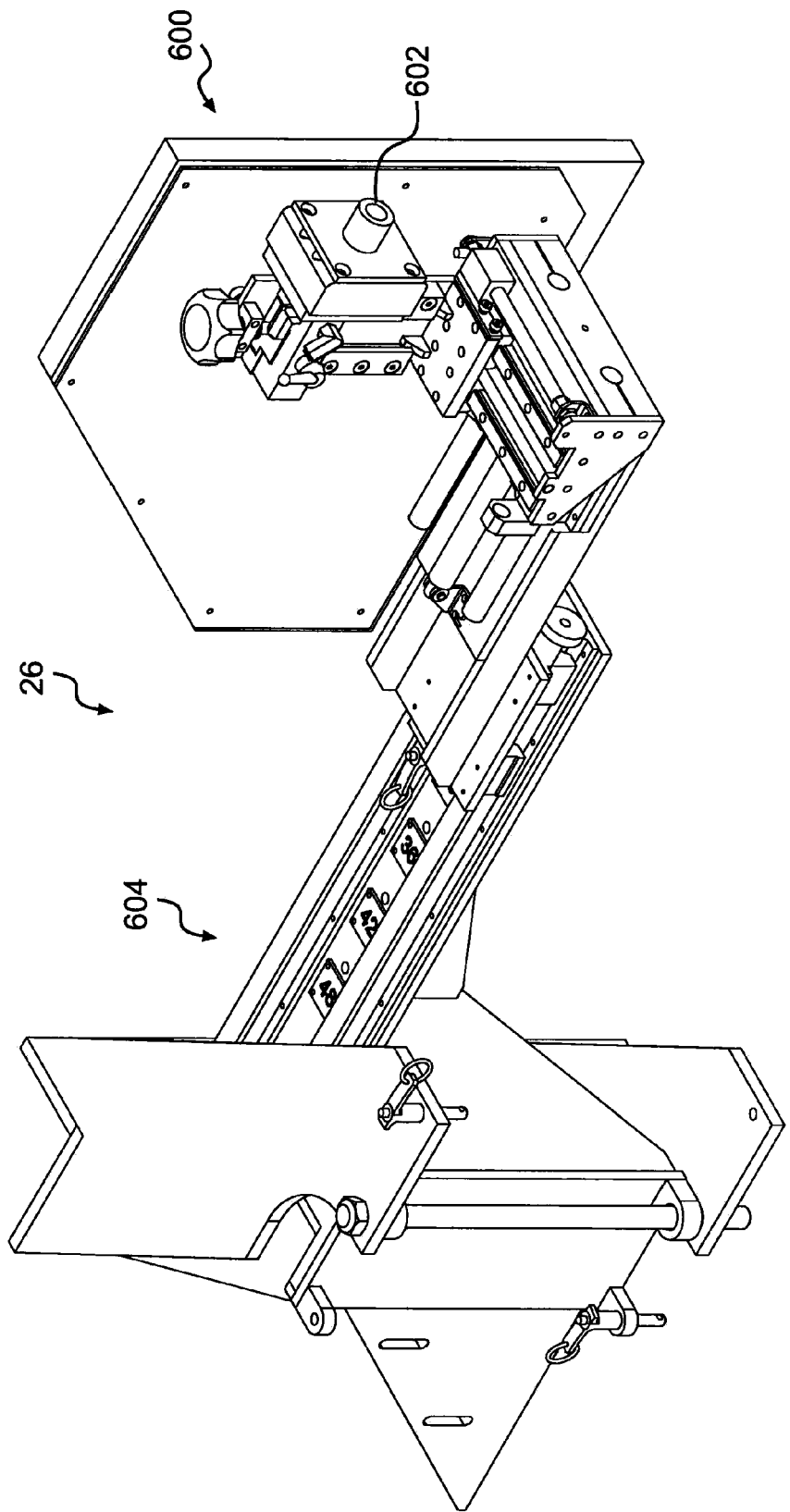
FIG. 13A is a perspective view of another exemplary punch for deforming an outer wall of the exemplary coupling performs.
Figure 13B:
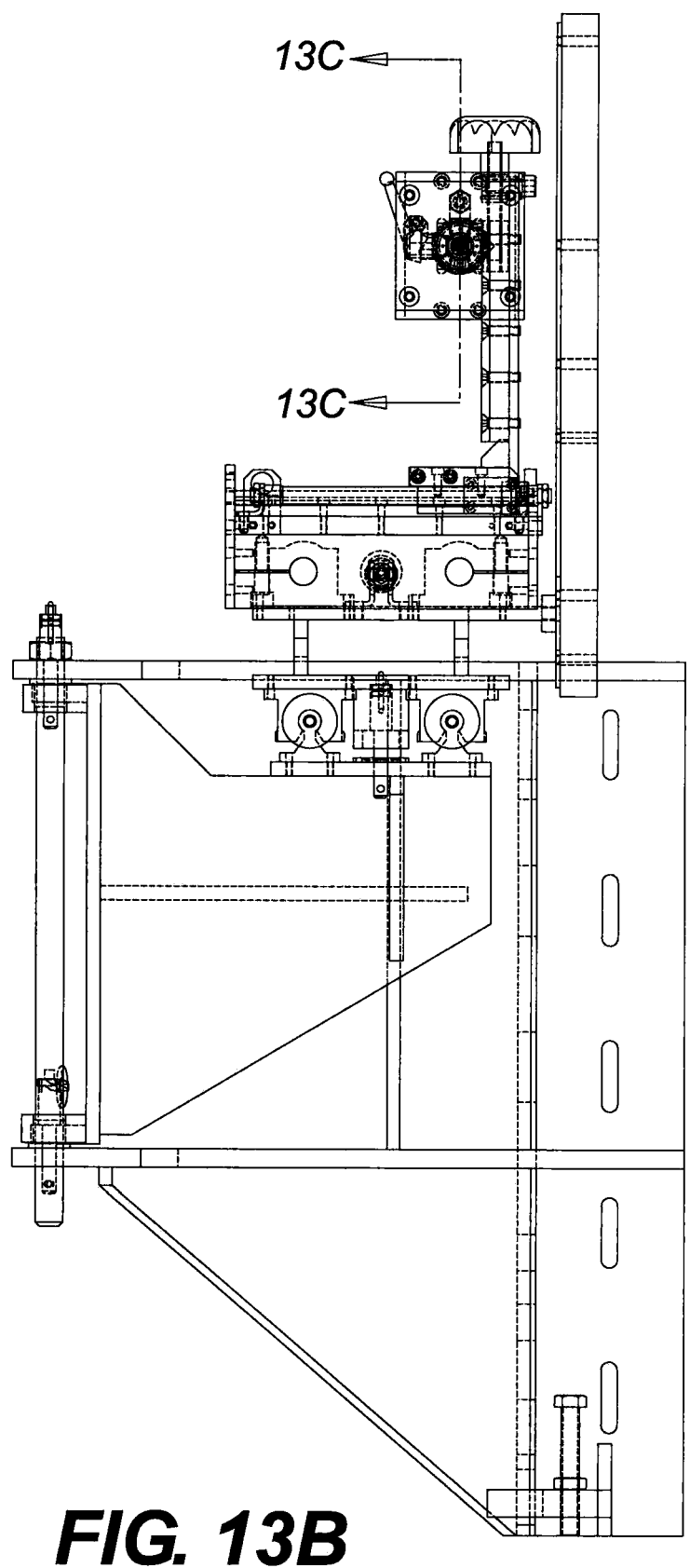
FIG. 13B is a front view of the exemplary punch of FIG. 13A.
Figure 13C:
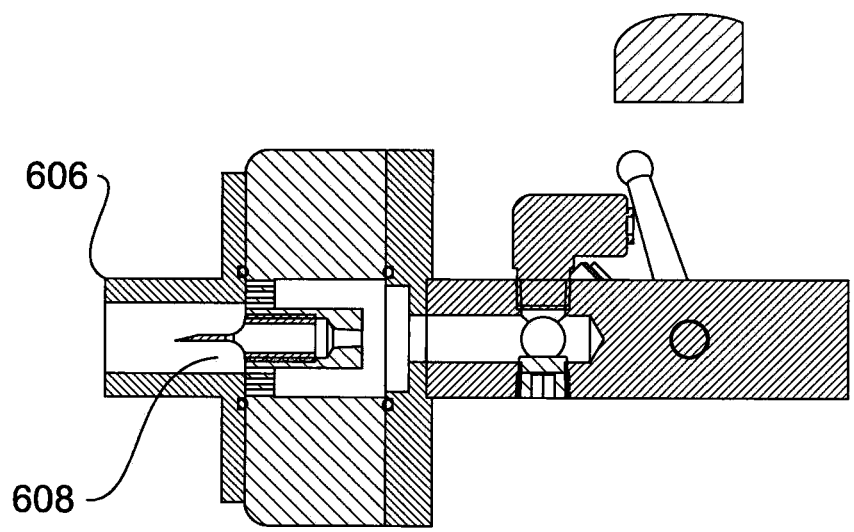
FIG. 13C is a cross-sectional detail view of the exemplary punch of FIG. 13A.

FIG. 13A is a perspective view of another exemplary punch 600 for deforming an outer wall of the exemplary coupling performs. In general, punch 600 may include a vacuum device 602 mounted to chassis 604, such that vacuum device 602 may be selectively translated radially inward toward and outward away from a pipe. Vacuum device 602 may be disposed in communication with a vacuum pump and configured to draw a vacuum against an outer wall of pipe when translated inward toward the pipe. FIG. 13B is a front view of the vacuum device 602 of FIG. 13A, and FIG. 13C is a cross-sectional detail view of the exemplary punch of FIG. 13A. As shown in FIG. 13C, vacuum device 602 may include a tubular element 606, which is mounted to a front end of vacuum device 602. Tubular element 606 may be disposed in fluid communication with the vacuum pump or other vacuum source of vacuum device 602. Tubular element 606 may also be positioned to contact the outer wall when punch 600 and/or vacuum device 602 is translated inward toward the pipe. As further shown in FIG. 13C, tubular element 606 may have a sharp point 608 disposed therein. Sharp point 608 may be any suitable type of needle or dagger, such as a sharpened drill bit. Sharp point 608 may be positioned inside tubular element 606 such that it contacts and punctures a section of outer wall drawn into the tubular element 606 by the vacuum induced therein. Thus, sharp point 608 may facilitate suitable puncturing of the outer wall so that punch device 602 may draw a vacuum from the space behind the outer wall. In one embodiment, either or both of the tubular element 606 and sharp point 608 may be configured to translate relative to punch device 602, independently or together.

In view of the foregoing, it will be appreciated that either of punch 500 or punch 600 may be disposed relative to bell and spigot portions of a pipe, as shown in either of the configurations of FIGS. 4 and 5. That is, punches 500 and 600 may be positioned over annular closed cavity 170 between an adjacent spigot portion 114 and bell portion 112, or over bell terminus 152 and bell terminus gap 153. Thus, either of punch 500 and punch 600 may be positioned and configured to draw a vacuum against the outer wall 124, thereby puncturing a hole in the outer wall 124, and then drawing a vacuum on annular closed cavity 170, so as to draw down the outer wall 124 against the corrugated wall 122. A plurality of punches 500 and punches 600 may be positioned at various locations, radially, around the translating pipe. For example, two punches may be disposed at 180 degrees, on opposing sides of the translating pipe. Alternatively, four punches may be disposed at 90 degrees from each other around the translating pipe.

As will be appreciated by one of skill in the art, the presently disclosed coupling, pipe section, and methods may enjoy numerous advantages over previously known pipe coupling systems. First of all, because spigot portions 114, 214 include three walls (i.e., inner wall 120, 220, corrugated wall 122, 222, and outer wall 124, 224), one of ordinary skill in the art would expect spigot portions 114, 214 to be substantially stronger than previously known spigots. Specifically, spigot portions 114, 214 may be made more rigid, without the use of extensive or excessive amounts of material. Similarly, because bell portions 112, 222 include two walls (i.e., outer wall 124, 224 and corrugated wall 122, 222), one of skill in the art would expect bell portions 112, 212 to be substantially stronger than previously known bells formed from a single wall of material. In particular, bell portions 112, 212 and spigot portions 114, 214 may be stronger than competing products that require the use of even more plastic for forming certain pipe walls.

Because there may be no significant change in the outer diameter of the pipe proximate to bell portions 112, 212, a substantially constant-dimension trench may be dug along the length of the pipe installation. Spigot portion 114, 214 may be designed in the interests of creating a larger sealing surface on spigot outer wall 164 and a stronger triple-wall structure. Spigot portion 114, 214 may be designed in the interests of creating a larger sealing surface on sealing portion 133, 233 of bell portion 112, 214 and a stronger triple-wall structure. In each embodiment, creating this larger sealing surface may reduce the probability of misalignment between bell portions 112, 212, spigot portions 114, 214, and gaskets 134, 234, respectively, and may simplify the installation process.

Thus, an exemplary bell, spigot, and gasket disclosed herein may create an ASHTO-compliant, water-tight coupling, without the need for additional reinforcement means, such as straps, hinged clamps, or wraps. Nevertheless, in some embodiments, it may still be desirable to deform the outer wall of a bell portion 112, 212 after inserting a spigot portion 114, 214 into the bell portion 112, 212. Finally, an exemplary coupling may be substantially "in-line", thus creating a consistent and simple product, which may be easily transported to a jobsite and installed. This provides advantages in terms of reducing both material supplies and man-hours.

Figure 14:
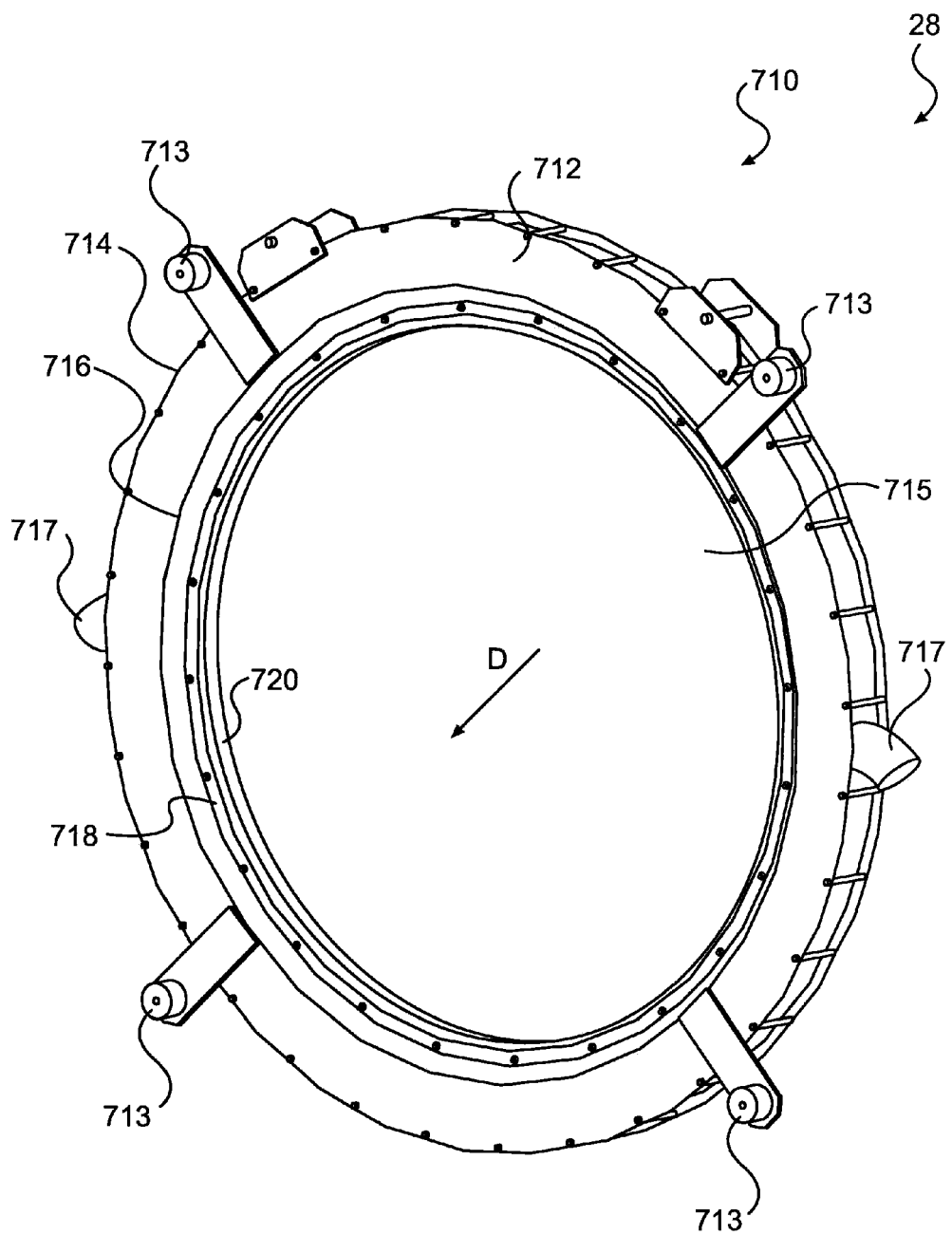
FIG. 14 is a perspective view of an exemplary embodiment of a air-cooler for cooling an outer wall of pipe.
Figure 15:
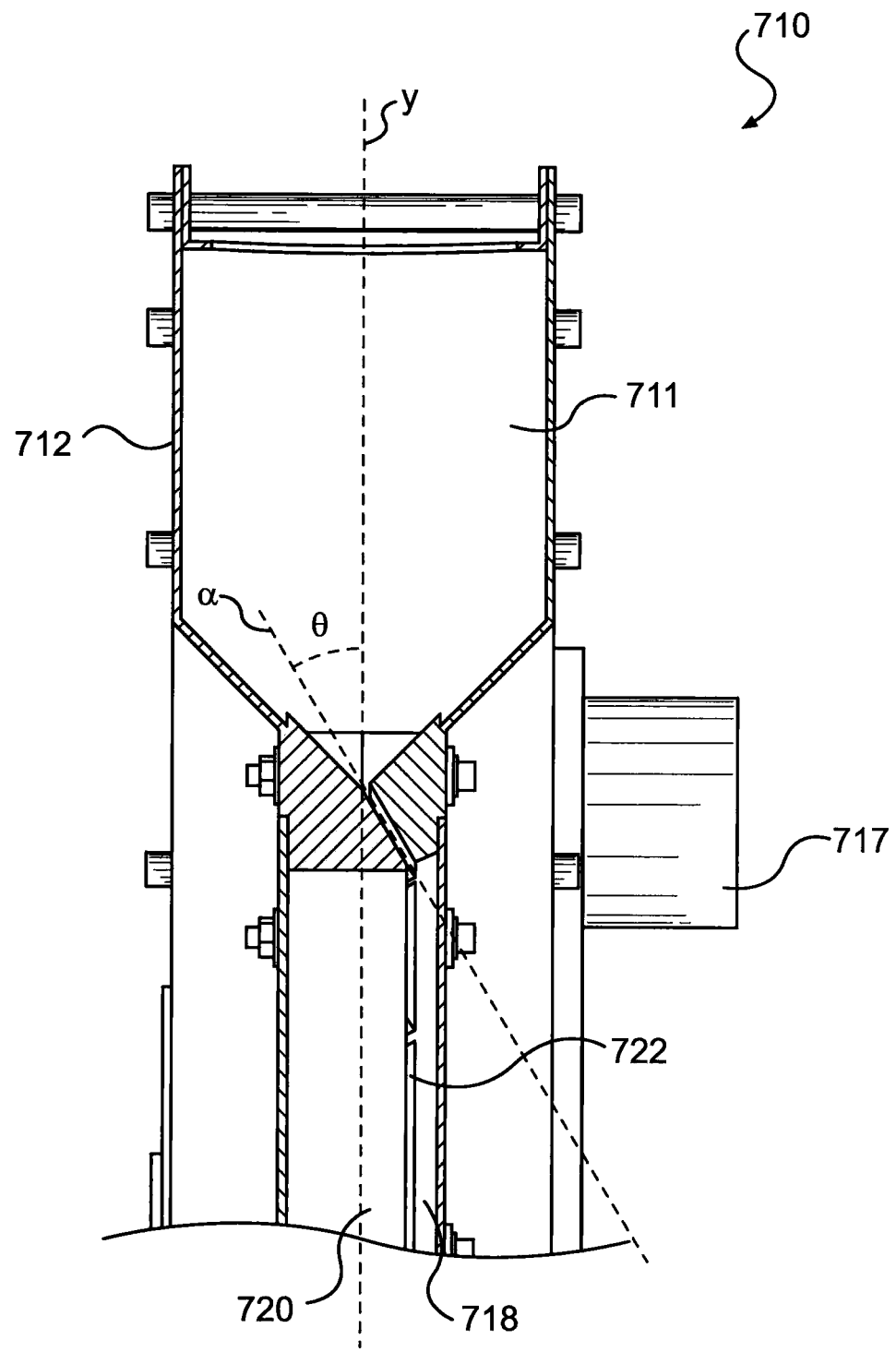
FIG. 15 is a partial, cross-sectional view of the exemplary air-cooler depicted in FIG. 14.
Figure 16:
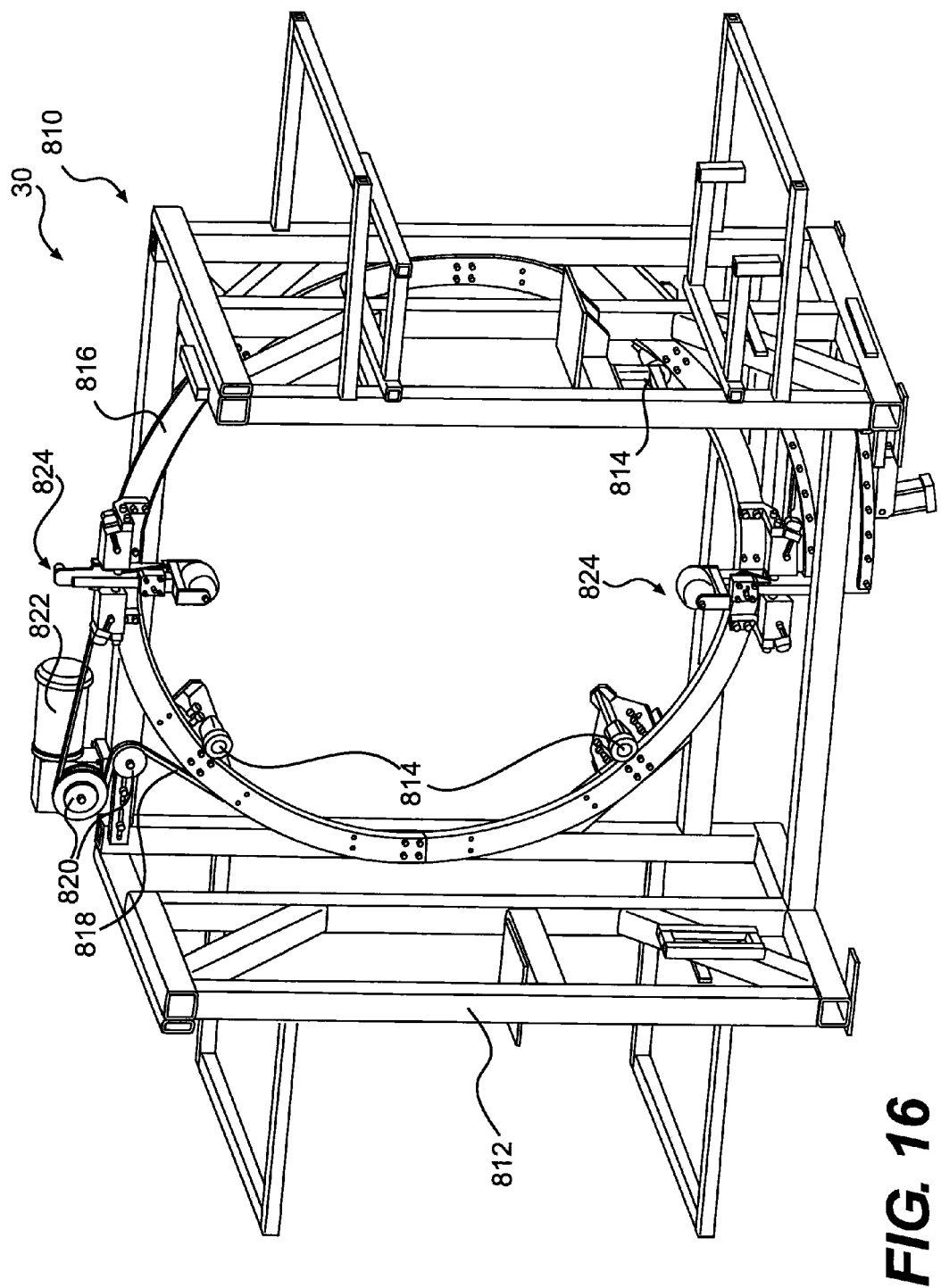
FIG. 16 is a perspective view of an exemplary embodiment of a press rolling apparatus for pressing an outer wall of pipe.

FIGS. 14-16 depict an exemplary air-cooler 710, which may be used to cool an outer layer of polymer pipe. For example, the exemplary air cooler 710 may be positioned to function as either or both of air rings 24 and 28 in system 10 of FIG. 1. In particular, when extruded from cross-head die 22, the outer layer of polymer may be extruded at a temperature high enough to bond or fuse the outer layer of polymer to corrugation crests of the corrugated wall. In some cases, it may be desirable to cool an outer layer of polymer pipe after the outer layer is extruded onto the exterior surface of a dual-wall corrugated polymer pipe, by incorporating air-cooler 710 at either or both of air rings 24, 28.

FIG. 14 illustrates an exemplary air-cooler 710 for cooling an outer layer of pipe. In one embodiment, air-cooler 710 may be used for cooling an outer layer of pipe after the outer layer is extruded onto the pipe but before the pipe enters a spray tank and/or perforator. For instance, air-cooler 710 may be mounted downstream from a pipe corrugator, a cross-head die, a vacuum punch, or any other multi-wall pipe manufacturing apparatus. Air-cooler 710 may be mounted upstream from a press-roller, a spray tank, a perforator, or any other pipe post-processing apparatus. In one embodiment, air-cooler 710 may be used without a spray tank in the event that air-cooler 710 is sufficient for desirably cooling the outer layer of pipe. Air-cooler 710 may include a plurality of brackets by which it may either support, or be mounted to, an adjacent pipe manufacturing apparatus. For example, air-cooler 710 may include a plurality of bearings 713, which may support an adjacent apparatus (e.g., press roller 30, 810) configured to press an outer layer of pipe against an inner layer of pipe.

Air-cooler 710 may include an annular air manifold 712, which has an outer diameter 714 and an inner diameter 716. Air-cooler 710 may have an interior aperture 715 defined by inner diameter 716, through which a multi-layer pipe may be conveyed. Specifically, as shown in FIG. 14, a multi-wall pipe may be configured to continuously translate in a direction "D" through interior aperture 715 of air-cooler 710.

As illustrated in FIG. 14, air-cooler 710 may include one or more air inlets 717 disposed in fluid communication with air manifold 712. As shown in the embodiment of FIG. 14, air inlets 717 may be in fluid communication with air manifold 712 at outer diameter 714. Air inlets 717 may also be disposed in fluid communication with a pressurized air supply (not shown). For example, air inlets 717 may connect an interior of air manifold 712 with a hose or duct connected to an air pump (not shown). Thus, air inlets 717 may be configured to convey pressurized air into a hollow interior of air manifold 712. The embodiment of FIG. 14 depicts air-cooler 710 having two air inlets 717, each being disposed 180° from the other around air manifold 712. However, it will be appreciated that air-cooler 710 may include any number of air inlets 717, it being understood that additional air inlets may reduce turbulence in air manifold 712 and reduce the distance that air must travel around air manifold 712 before exiting towards interior aperture 715.

In order to release pressurized air from air manifold 712 into interior aperture 715, air-cooler 710 may further include a first ring 718 and a second ring 720. First ring 718 and second ring 720 may be disposed along inner diameter 716 of air manifold 712. Moreover, first ring 718 and second ring 720 may be formed substantially adjacent to each other and configured to form an annular opening between air manifold 712 and interior aperture 715. Thus, first ring 718 and second ring 720 may form an annular passageway through which pressurized air may exit air-cooler 710 around its entire inner diameter 716.

FIG. 15 illustrates a cross-section of one portion of the exemplary air-cooler 710 of FIG. 14. As shown in FIG. 15, air manifold 712 may include a hollow interior duct 711. Interior duct 711 may be an annular shaped conduit that runs around the entire circumference of air manifold 712. FIG. 15 illustrates an air inlet 717 in communication with a portion of interior duct 711 spaced radially apart from that of the cross-section. Nevertheless, air inlet 717 may provide a supply of air around the entire circumference of interior duct 711. As described above, first ring 718 and second ring 720 may be provided in communication with interior duct 711 along inner diameter 716 of air manifold 712. Moreover, first ring 718 and second ring 720 may be cooperatively spaced apart so as to form an annular passageway 722 from interior duct 711 to interior aperture 715.

Thus, air may travel from a pressurized supply into interior duct 711 via air inlet 717. Moreover, air may travel from interior duct 711 into interior aperture 715 via annular passageway 722. As depicted in FIG. 15, first ring 718 and second ring 720 may be shaped so as to form annular passageway 722 as a slit angled relative to a central axis "y" of the air-cooler 710. Specifically, at each point around the circumference of air-cooler 710, annular passageway 722 may be oriented along an axis "α," which is disposed at an angle "Θ" from central axis "y." In one embodiment, angle "Θ" may be between 5° and 40°. In another embodiment, angle "Θ" may be between 710° and 720°. In yet another embodiment, angle "Θ" may be approximately 715°. First ring 718 and second ring 720 may be provided with any suitable type of mechanism configured to selectively adjust angle "Θ". Moreover, first ring 718 and second ring 720 may be provided with any suitable type of mechanism configured to translate first ring 718 and second ring 720 relative to each other, so as to adjust a width of annular passageway 722.

Interior duct 711 may be provided with any type of interior liner (not shown) disposed in fluid communication with air inlet 717 and annular passageway 722. Moreover, interior duct 711 may be provided with any type of heating apparatus, cooling apparatus, chemical ejecting apparatus, liquid ejecting apparatus, vapor ejecting apparatus, and/or particle ejecting apparatus. Thus, interior duct 711 may be configured to convey any type of treated air, fluid, or other desired material from interior duct 711, through annular passageway 722, and into interior aperture 715, so as to selectively treat an exterior surface of a pipe conveyed through interior aperture 715.

As illustrated in FIG. 1, the exemplary air-cooler 24, 28, 710 may be disposed in a pipe manufacturing system downstream from a cross-head die 22. Specifically, in a multi-wall pipe manufacturing process, a cross-head die 22 may be used to extrude an outer layer of polymer 124 onto a dual-wall pipe. In one embodiment, the outer layer of polymer 124 may be extruded at a temperature sufficiently high to allow the outer layer to properly bond with corrugation crests of corrugated wall 122. Specifically, the outer layer of polymer 124 may be hot enough to at least partially melt the corrugation crests of corrugated wall 122, such that polymer chains of corrugated wall 122 and outer wall 124 intersperse and then cool together. This may result in corrugated wall 122 and outer wall 124 being integrally fused or bonded together at each corrugation crest of corrugated wall 122.

Because the outer wall of polymer 124 may be extruded at a high temperature, it may exhibit behavior that is detrimental to forming an outer wall 124 with particular aesthetic and/or structural characteristics. For example, the hot outer layer of polymer may droop between adjacent corrugation crests of corrugated wall 122. Furthermore, the hot outer layer may be undesirably deformed by processes performed downstream from its extrusion. The hot outer layer may also contribute to hot gas being trapped in spaces formed between corrugated wall 122 and outer wall 124.

Air-cooler 710 may be configured to cool an outer surface of outer wall 124 but not a middle or an inner surface of outer wall 124. In one embodiment, the outer surface of outer wall 124 may be cooled just enough to create a thin layer of solidified material on its outer surface. Thus, an outer wall perforating apparatus positioned downstream from air-cooler 710 may be able to create clean perforations in outer wall 124 without causing undesirable deformation of outer wall 124. Moreover, because air-cooler 710 may cool an outer surface of outer wall 124, a spray tank apparatus positioned downstream from air-cooler 710 may be mitigated from causing undesirable deformation and texturing of the outer surface of outer wall 124. By avoiding spray tank texturing, outer wall 124 may be more aesthetically pleasing and it may provide more tensile strength than an outer wall impacted by water in a spray tank before a air-cooling process. However, as described above, air-cooler 710 may be used without a spray tank in the event that air-cooler 710 is sufficient for desirably cooling the outer layer of pipe, in which case outer layer deformation and texturing may be avoided altogether. Air-cooler 710 may also be configured to avoid cooling outer wall 124 so much that air trapped between corrugated wall 122 and outer wall 124 will cool down, reduce in volume, and create a deformation-inducing vacuum in spaces between corrugation crests of corrugated wall 122 and outer wall 124.

In one embodiment, cross-head die 22 may extrude the outer layer of polymer 126 such that it creates slightly concave portions in outer wall 124 between adjacent corrugation crests of corrugated wall 122. Specifically, outer wall 124 may have a concave portion extending across each corrugation valley and between adjacent corrugation crests of corrugated wall 122. Air-cooler 710 may be used to cool outer wall 124 at a rate that facilitates the formation of a desirable amount of concavity in concave portions in outer wall 124. For example, air-cooler 710 may cool outer wall 124 quickly enough to mitigate the effect that gravity would otherwise have on the still molten outer wall 124 after it is extruded from cross-head die 22. This may be performed to prevent gravity from making concave portions on the top of the pipe more concave, and making concave portions on the bottom of the pipe less concave. Thus, air-cooler 710 may cool outer wall 124 at a rate that promotes uniformity of the profile of outer wall 124 around its entire circumference and along its length.

Air-cooler 710 may be used to cool outer wall 124 at a rate that is a function of the temperature and pressure of air conveyed through air-cooler 710. The rate of cooling may also be a function of the difference between the temperature of air conveyed through the air-cooler and the temperature of the outer wall 124. In one embodiment, the pressurized air is at the temperature of ambient air. However, it will be appreciated that the pressurized air may be heated or cooled to any temperature. The air may be pressurized such that air in air manifold 712 has a pressure between approximately 0.5 PSI and 30.0 PSI. Moreover, the air may be pressurized so as to provide a pressure against the pipe of approximately 3 cfm/inch to 8 cfm/inch on the pipe surface. Of course, it will be appreciated that any desired air flow rate is contemplated for use in cooling or otherwise treating the pipe. Moreover, both the temperature and flow rate of the air may be readily adjusted manually, or automatically in real-time, as desired.

FIGS. 16-19 depict an exemplary press roller 810, which may be incorporated as the press roller 30 of FIG. 1. Even when the outer layer of polymer is extruded at a high temperature, the outer layer can sometimes insufficiently bond or fuse to the exterior surface of the pipe. Specifically, even though a very thin layer of the exterior surface may weld to the newly extruded outer layer, the level of bonding may be too shallow to provide a sufficient weld between the outer layer and the exterior pipe surface. Thus, a high extrusion temperature can sometimes be insufficient for thoroughly bonding an outer layer beyond the immediately exterior surface of a polymer pipe. Accordingly, press roller 810 may be used for pressing an outer wall of pipe to achieve sufficient bonding between an outer layer of polymer and the polymer pipe.

The outer layer of polymer may be extruded at a temperature high enough to at least partially bond or fuse the outer layer of polymer to corrugation crests of the corrugated wall. For example, the hot outer layer of polymer may at least partially melt the corrugation crests of the corrugated wall. Alternatively, the corrugation crests of the corrugated wall may be heated by use of a separate heating element, in order to increase their level of bonding with the extruded outer layer. However, a high extrusion temperature can sometimes be insufficient for thoroughly bonding an outer layer beyond the immediately exterior surface of a polymer pipe. For this reason, pressure may be applied to the outer layer to increase the depth of bonding beyond the immediately exterior surface of the polymer pipe. Thus, in some cases, it may be desirable to press an outer layer of polymer pipe against the exterior surface of a dual-wall corrugated polymer pipe after the outer layer of polymer is extruded onto the dual-wall corrugated polymer pipe.

FIG. 16 illustrates an exemplary embodiment of a press rolling apparatus 810. Press rolling apparatus 810 may include a frame 812 having a plurality of bearings 814 disposed thereon. In one embodiment, frame 812 may have four bearings 814, each of the four bearings 814 being rotatably disposed on a quadrant of frame 812. Press rolling apparatus 810 may further include an annular carriage 816. Annular carriage 816 may be rotatably disposed on and engaged with bearings 814. Thus, annular carriage 816 may be configured to rotate about a central axis, relative to frame 812, as guided by bearings 814.

Press rolling apparatus 810 may further include a drive belt 818, a pulley system 820, and a motor 822. Drive belt 818 may be configured to be wrapped around an outer groove disposed in annular carriage 816 and around wheels of pulley system 820. At least one wheel of pulley system 820 may be driven by motor 822. Thus, motor 822 may be configured to selectively control a rotation of annular carriage 816 by manipulating drive belt 818 via pulley system 820. Annular carriage 816 may be selectively rotated by any other suitable mechanism, such as a rack and pinion drive, a spiral gear, a gas spring, a crank system, a hydraulic system, a pneumatic system, and/or an electromagnetic drive.

Press rolling apparatus 810 may further include a plurality of press rolling mechanisms 824 disposed on annular carriage 816. As illustrated in the embodiment of FIG. 16, press rolling apparatus 810 may include two press rolling mechanisms 824, each being disposed 180° apart from each other on annular carriage 816. Alternatively, press rolling apparatus 810 may include any number of press rolling mechanisms 824, as desired. As will be described in greater detail below, each press rolling mechanism 824 may be provided with a pressing element configured to press against an outer wall of pipe as the pipe is conveyed through press rolling apparatus 810. Even though press rolling apparatus 810 will be described with respect to an embodiment in which press rolling mechanisms 824 are attached to a rotating annular carriage 816, any equivalent or similar mechanism may be used. For example, annular carriage 816 may be fixed to frame 812, and a pressing element may be configured to advance around a circumferential path of annular carriage 816 in any way that suitably rotates the pressing element about a pipe conveyed through press rolling apparatus 810.

Figure 17:
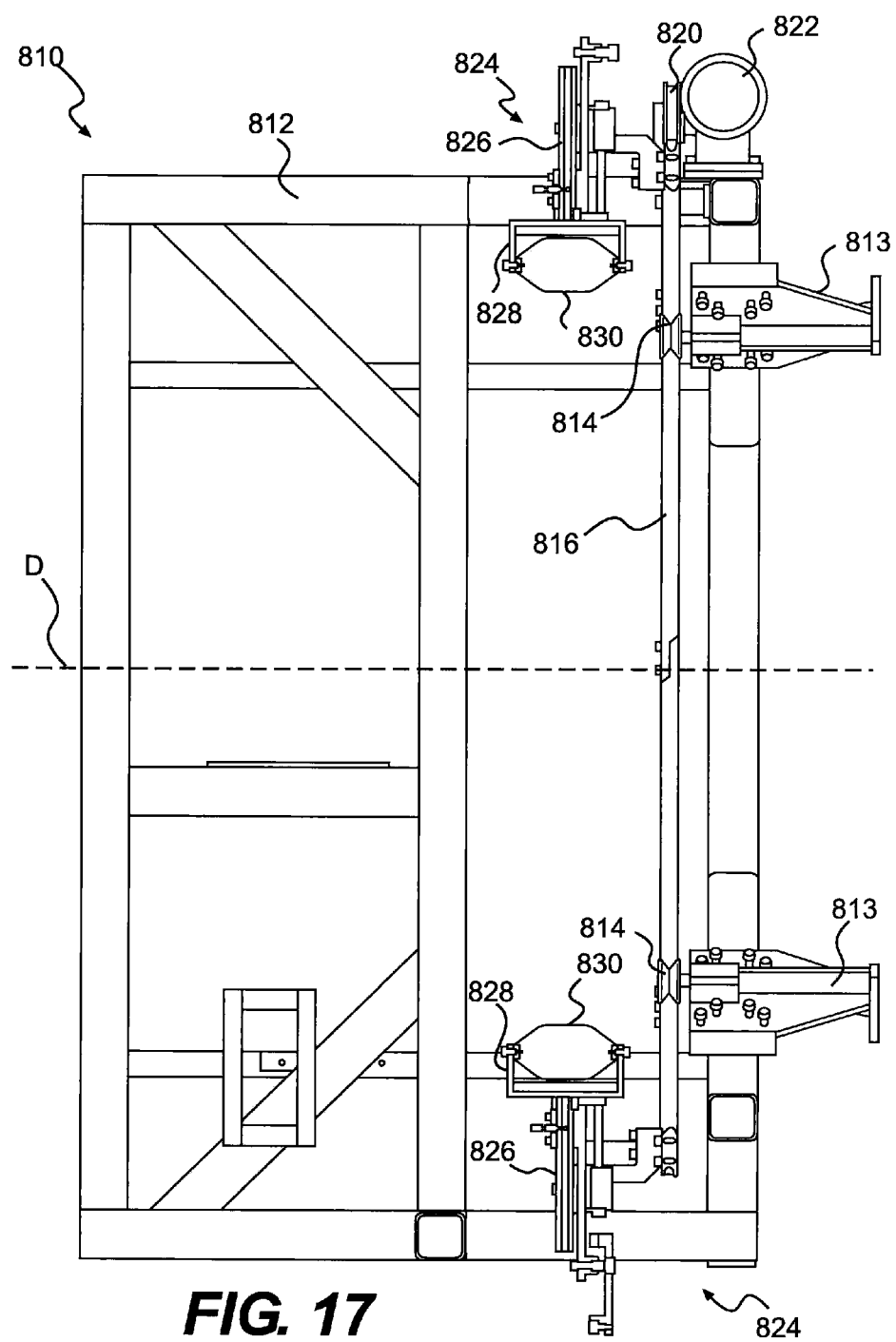
FIG. 17 is a side view of the exemplary press rolling apparatus depicted in FIG. 16.

FIG. 17 illustrates a side view of an exemplary embodiment of press rolling apparatus 810. As described above, press rolling apparatus 810 may include frame 812 having bearings 814. Annular carriage 816 may be rotatably disposed on bearings 814. Motor 822 and pulley system 820 may be configured to rotate annular carriage 816 on bearings 814. Annular carriage 816 may rotate about a central axis "D", along which a pipe may be continuously conveyed through press rolling apparatus 810. In the exemplary embodiment of FIG. 17, two press rolling mechanisms 824 are illustrated as being disposed 180° apart from each other on annular carriage 816.

In one embodiment, each press rolling mechanism 824 may include a linkage 826, a bracket 828, and a pressing element 830. Linkage 826 may translatably mount bracket 828 to annular carriage 816. Bracket 828 may rotatably mount pressing element 830 to linkage 826. It will be appreciated that any equivalent or similar system of brackets and linkages may be used to allow pressing element 830 to translate and/or rotate relative to annular carriage 816 and/or frame 812 of press rolling apparatus 810, as desired.

Figure 18:
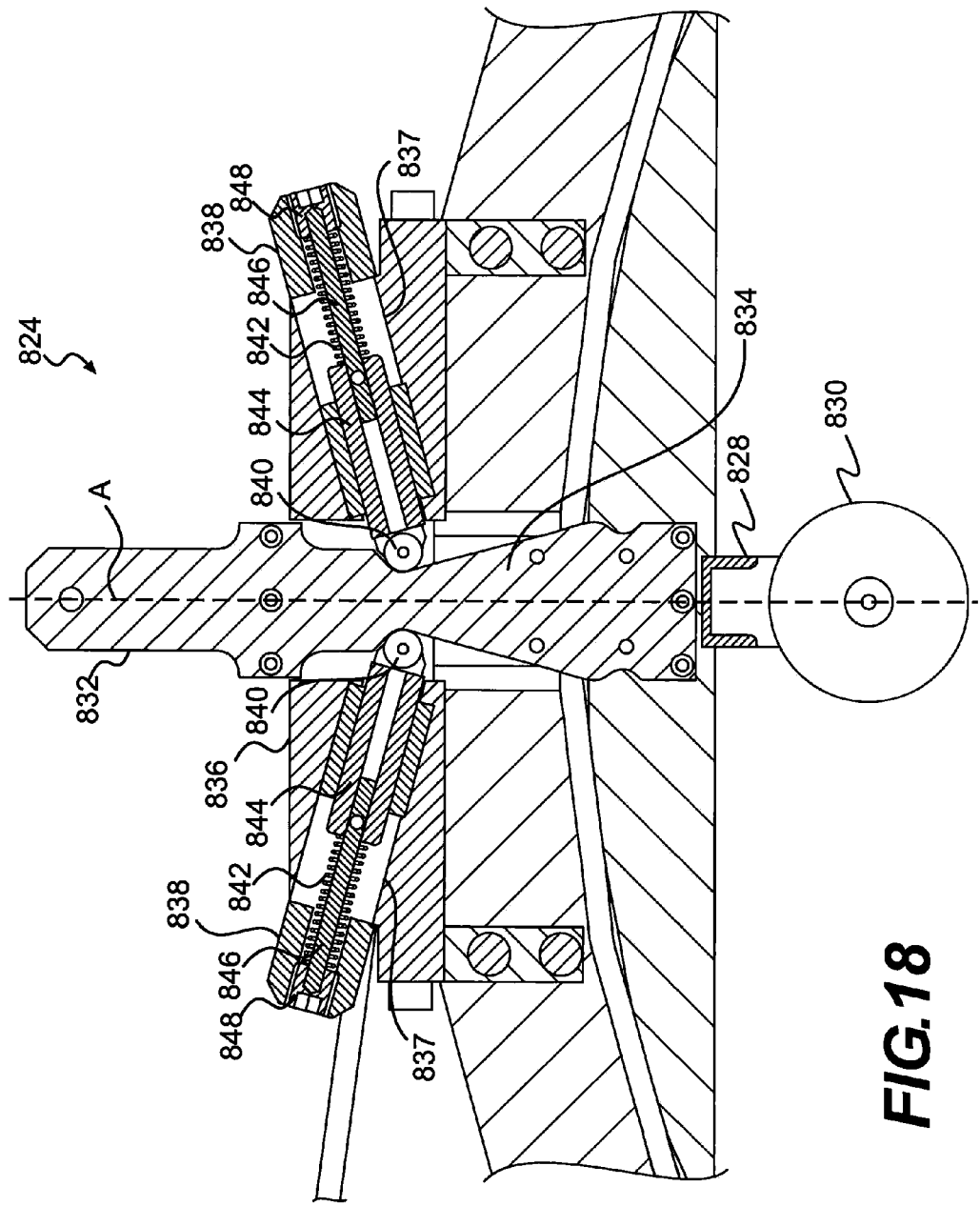
FIG. 18 is a cross-sectional view of a portion of the exemplary press rolling apparatus depicted in FIGS. 16 and 17.

FIG. 18 illustrates a cross-section of one exemplary embodiment of a press rolling mechanism 824. Press rolling mechanism 824 may include a translating member 832, a bracket 828, and a pressing element 830. Translating member 832, bracket 828, and pressing element 830 may be fixed to each other in series, as shown in FIG. 18, and configured to translate together along an axis "A" through a block 836 mounted to annular carriage 816. Translating member 832 may include an angled plate 834 disposed integrally therein. Press rolling mechanism 824 may also include a plurality of opposing cam followers 840 configured to engage opposing faces of angled plate 834. Each cam follower 840 may be rotatably disposed at an end of a cylinder 844 connected to a threaded rod 846. Cam follower 840, cylinder 844, and threaded rod 846 may be configured to translate together in a bore 837 formed in block 836. A compression spring 842 may be disposed around threaded rod 846 between cylinder 844 and a threaded bolt 848 disposed in an end cap 838. Compression spring 842 may be configured to urge cylinder 844, and therefore cam follower 840 in a direction toward axis "A".

As shown in the exemplary embodiment of FIG. 18, a pair of opposing cam followers 840 may be configured to contact and press against opposing faces of angled plate 834. Given a particular geometry of angled plate 834, compression springs 842 and cam followers 840 may urge translating member 832, bracket 828, and pressing element 830 along axis "A" toward a center point of annular carriage 816. Thus, pressing element 830 may be urged in a direction towards an axis along which a pipe may be conveyed through annular carriage 816 of press rolling apparatus 810. An amount of urging provided by compression springs 842 may be adjusted by turning threaded bolts 848 so as to compress or relax compression springs 842. Any other suitable device may be used to selectively urge pressing element 830 toward a center point of annular carriage 816. For example, a rack and pinion drive, a spiral gear, a gas spring, a crank system, a hydraulic system, a pneumatic system, and/or an electromagnetic drive may be used to selectively urge pressing member 830 toward a center point of annular carriage 816.

Figure 19:
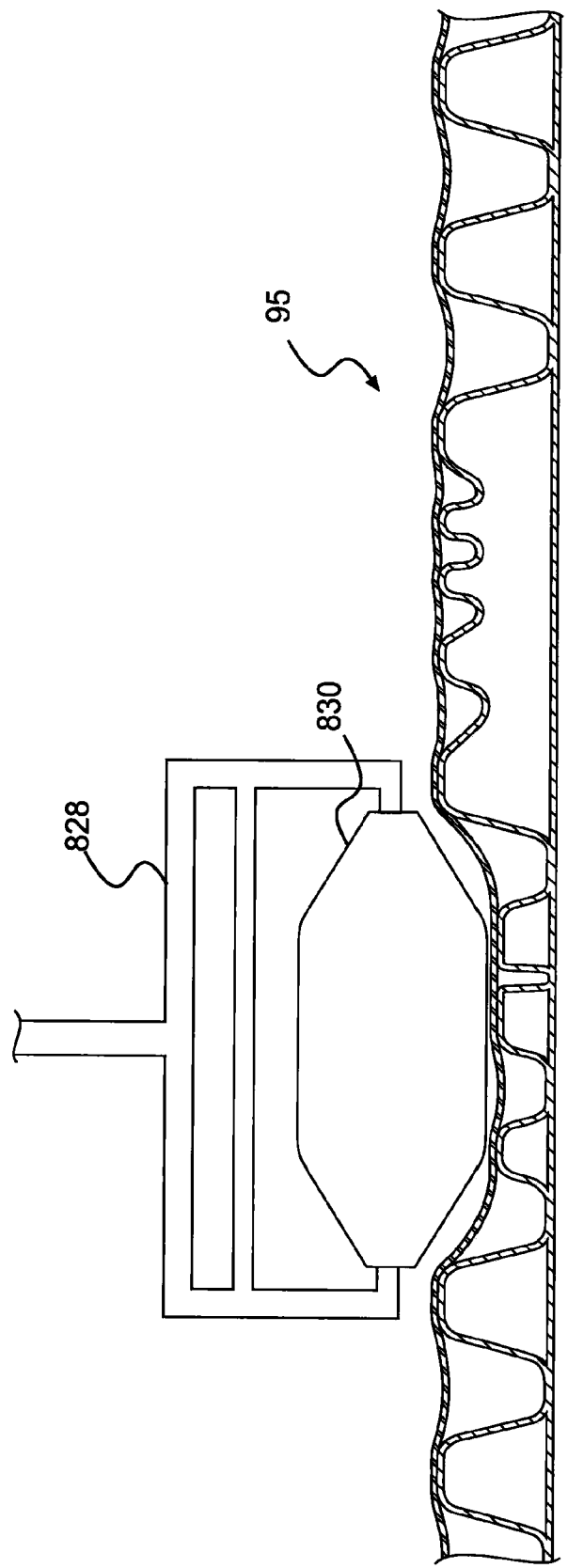
FIG. 19 is a cross-sectional view of an exemplary three-wall polymer pipe and a portion of the exemplary press rolling apparatus depicted in FIGS. 16-18.

FIG. 19 illustrates an exemplary embodiment of a bracket 828 and a pressing element 830 engaging a three-wall pipe 95. As illustrated in FIG. 19, pressing element 830 may be a relatively cylindrical press roller configured to rotate about a portion of bracket 828. In one embodiment, pressing element 830 may be a press roller made from a solid slug of Teflon®. Pressing element 830 may have a generally rounded profile configured to rotate about bracket 828 and roll across a surface of multi-wall pipe. As illustrated in FIG. 19, pressing element 830 may be a press roller that is substantially cylindrical, with tapered ends configured to walk up and down bell and spigot areas. In another embodiment, pressing element 830 may be a press roller having a substantially octagonal cross-section. In yet another embodiment, pressing element 830 may be a press roller having a substantially circular cross-section. In yet another embodiment, pressing element 830 may be a press roller having a substantially rectangular cross-section. In yet another embodiment, pressing element 830 may be a press roller having a substantially square cross-section.

FIG. 19 illustrates the exemplary pressing element 830 contacting an outer wall of three-wall pipe 95. Specifically, pressing element 830 may press against an outer wall of three-wall pipe 95, thereby urging an outer wall of three-wall pipe 95 against an inner wall of three-wall pipe 95. It will be appreciated that the inward urging provided by press rolling mechanism 824 to pressing element 830 may be used to compress any two or more layers or walls of a pipe having any number of layers or walls, and any type of geometry. Specifically, as illustrated in FIG. 19, pressing element 830 may have any cross-sectional geometry that allows it to accommodate changing diameters along a length of multi-wall pipe. Moreover, pressing element 830 may be especially configured to accommodate changing diameters of pipe due to translation of pressing element 830 as allowed by translating member 832. Thus, pressing element 830 may be configured to press against a pipe having any desired diameter. However, regardless of any translation of pressing element 830, a sufficient amount of pressing force may be applied to an outer wall of multi-wall pipe by adjusting compression springs 842, via threaded bolts 848.

Thus, the presently disclosed press rolling apparatus 810, press rolling mechanisms 824, and pressing element 830 may be particularly advantageous for use in a method of pressing against an outer wall of pipe. The method may include extruding a layer of polymer from a cross-head die onto a pipe to form an outer wall of pipe. The method may further include conveying the pipe including the outer wall of pipe through a press rolling apparatus 810 having a pressing element 830 configured to rotate about the pipe. The method may further include mounting pressing element 830 to an annular carriage 816 and rotating annular carriage 816 about the pipe. The method may further include rotatably mounting pressing element 830 on a bracket 828 and urging bracket 828 and pressing element 830 against an exterior surface of the outer wall, via a spring bias, as pressing element 830 rotates about a pipe conveyed through press rolling apparatus 810. The method may further include rotating annular carriage 816 at a predetermined velocity based on an outer diameter of the pipe and an axial velocity of the pipe through press rolling apparatus 810.

The presently disclosed apparatus and method may be advantageous in forming a proper bonding, fusion, or welding between adjacent layers of polymer in a multi-wall polymer pipe. Specifically, even when an outer wall of pipe is extruded at a high temperature, the presently disclosed apparatus and method may be used to increase the depth of bonding between the outer wall of pipe and an adjacent wall of a polymer pipe. As a result, a multi-wall pipe made by using the above-described exemplary apparatus and method may benefit from increased strength due to the ability of an outer wall of pipe to support forces on the outside of the pipe and from within the pipe. For example, when an outer wall is extruded onto a dual-wall pipe comprising a smooth inner wall and a corrugated wall, the pressing apparatus and method may allow the outer wall to better support tensile forces transmitted between adjacent corrugations of the corrugated wall.

Figure 20:
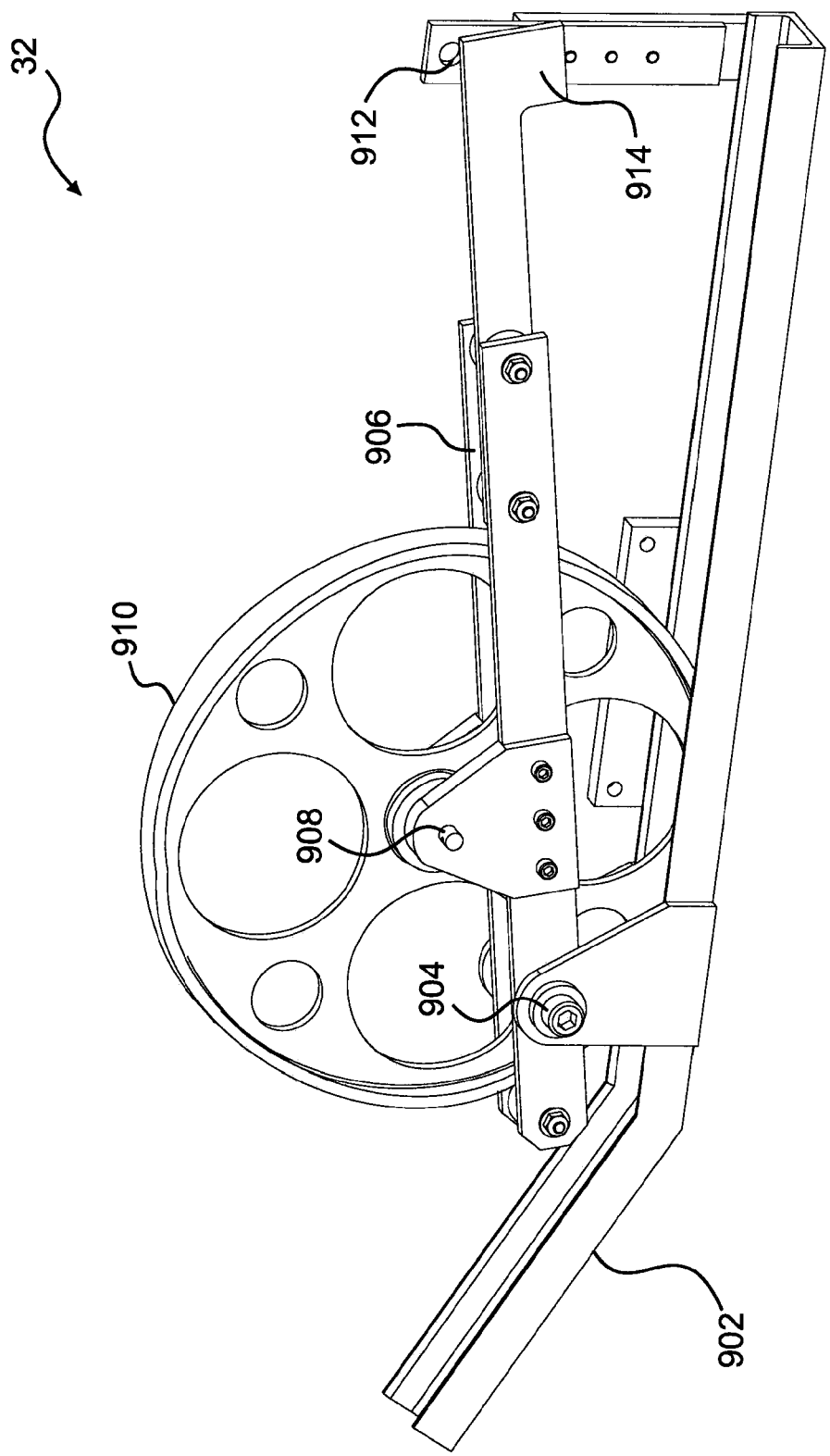
FIG. 20 is a perspective view of an exemplary wheel sensor.

FIG. 20 depicts an exemplary embodiment of sensor 32, in which sensor 32 includes a ski frame 902 and a wheel 910. Ski frame 902 includes a pivot point 904, and an arm 906 that pivots about pivot point 904. Arm 906 includes an axis 908, about which wheel 910 is configured to freely rotate. Arm 906 also includes a sensor flag 914, which is configured to pivot about pivot point 904 along with arm 906, as guided by wheel 910. In other words ski frame 902 may be disposed in a fixed position in system 10, such as above the three-wall pipe as it is being manufactured. Wheel 910 may be configured to contact and roll along the three-wall pipe as it translates below the ski frame 902. As wheel 910 rolls over corrugation crests and valleys, it pivots up and down around pivot point 904, thereby pivoting arm 906 and sensor flag 914. Sensor flag 914 is configured to be detected by motion sensor 912. Therefore, sensor 32 is configured to detect the motion of sensor flag 914, wheel 910, and thus the up and down oscillations of the corrugation crests and valleys in the three-wall pipe, as the pipe translates below sensor 32. As described above, the output of sensor 32 (i.e., information about the location of crests and valleys) may be directed to PLC 50 or any other component of system 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for manufacturing multi-wall corrugated polymer pipe, the system comprising:
    an extruder configured to co-extrude concentric annular tubes;

a corrugator configured to form the concentric annular tubes into a dual-wall pipe having a smooth wall and a corrugated wall, the corrugated wall including bell and spigot portions;

a cross-head die configured to extrude an outer wall of pipe onto the corrugated wall of the dual-wall pipe;

a vacuum punch configured to penetrate the outer wall of pipe and draw a vacuum between the corrugated wall and the outer wall, such that the outer wall of pipe deforms inward toward the corrugated wall of pipe between the bell and spigot portions of the corrugated wall;

a press roller configured to press the outer wall against the corrugated wall, wherein the press roller is positioned downstream the vacuum punch; and a cutter configured to cut the pipe into sections where the vacuum punch deformed the outer wall between the bell and spigot portions of the corrugated wall.

2. The system of claim 1, further comprising:
an air ring configured to blow cooling air at the outer wall.

3. The system of claim 2, wherein the air ring is positioned downstream from the vacuum punch, and the press roller is positioned downstream from the air ring.

4. The system of claim 1, further comprising an air ring mounted to the cross-head die, the air ring being configured to blow air against the outer wall of pipe as it exits the cross-head die.

5. The system of claim 1, further comprising an outer wall punch, wherein the outer wall punch is configured to puncture holes in the outer wall between adjacent corrugation crests, to vent annular spaces between the outer wall and the corrugated wall.

6. The system of claim 5, wherein the outer wall punch is positioned downstream from the vacuum punch.

7. The system of claim 1, further comprising:
an outer wall punch configured to puncture holes in the outer wall between adjacent corrugation crests in the corrugated wall; and
a corrugation sensor configured to detect corrugations in one of the corrugated wall and the outer wall;
wherein the outer wall punch is actuated based on feedback received from the corrugation sensor.

8. The system of claim 7, further comprising an air ring positioned downstream from the vacuum punch and configured to blow cooling air at the outer wall;
wherein the corrugation sensor is disposed downstream from the air ring.

9. The system of claim 7, further comprising:
an air ring positioned downstream from the vacuum punch and configured to blow cooling air at the outer wall;
wherein the corrugation sensor is disposed downstream from the air ring and the press roller.

10. The system of claim 1, further comprising:
a first air ring mounted to the cross-head die, the first air ring being configured to blow air against the outer wall of pipe as it exits the cross-head die; and
a second air ring positioned downstream from the vacuum punch and configured to blow cooling air at the outer wall;
wherein the press roller is positioned downstream from the second air ring.

11. This system of claim 1, further comprising an inflatable seal for selectively sealing between the dual-wall pipe and an upstream end of the cross-head die.

12. A system for manufacturing multi-wall corrugated polymer pipe, the system comprising:
an extruder configured to co-extrude concentric annular tubes;
a corrugator configured to form the concentric annular tubes into a dual-wall pipe having a smooth wall and a corrugated wall;
a cross-head die configured to extrude an outer wall of pipe onto the corrugated wall of the dual-wall pipe;
a vacuum punch configured to penetrate the outer wall of pipe and draw a vacuum between the corrugated wall and the outer wall, such that the outer wall of pipe deforms inward toward the corrugated wall of pipe;
a press roller configured to press the outer wall against the corrugated wall, wherein the press roller is positioned downstream the vacuum punch; and
an outer wall punch configured to punch the outer wall between adjacent corrugations of the corrugated wall.

13. This system of claim 12, further comprising an inflatable seal for selectively sealing between the dual-wall pipe and an upstream end of the cross-head die.

* * * * *